United States Patent
Krug et al.

(10) Patent No.: US 9,293,268 B2
(45) Date of Patent: Mar. 22, 2016

(54) ULTRACAPACITOR VACUUM ASSEMBLY

(71) Applicant: Corning Incorporated, Corning, NY (US)

(72) Inventors: John Paul Krug, Painted Post, NY (US); Kamjula Pattabhirami Reddy, Corning, NY (US); James Scott Sutherland, Corning, NY (US); Todd Marshall Wetherill, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 105 days.

(21) Appl. No.: 14/087,761

(22) Filed: Nov. 22, 2013

(65) Prior Publication Data

US 2015/0143680 A1    May 28, 2015

(51) Int. Cl.
| | | |
|---|---|---|
| *H01L 21/66* | (2006.01) | |
| *H01G 11/32* | (2013.01) | |
| *H01G 11/86* | (2013.01) | |

(Continued)

(52) U.S. Cl.
CPC .............. *H01G 11/32* (2013.01); *H01G 11/28* (2013.01); *H01G 11/86* (2013.01); *H01G 13/04* (2013.01); *Y10T 29/43* (2015.01)

(58) Field of Classification Search
CPC ....... H01G 11/32; H01G 11/28; H01G 11/86; H01G 13/04; H01G 9/155; H01G 11/58; H01G 11/62; H01G 11/60; H01G 28/40; H01G 11/52; Y02E 60/325; Y02E 60/122; Y02E 60/36; Y02E 60/327; H01L 28/84

USPC ............... 257/532, E27.048; 427/77, 79; 438/381, 253

See application file for complete search history.

(56) References Cited

U.S. PATENT DOCUMENTS

| | | | | |
|---|---|---|---|---|
| 5,800,857 A | * | 9/1998 | Ahmad ................ | H01G 9/155 29/25.01 |
| 5,948,464 A | * | 9/1999 | Delnick ................ | C25B 9/10 427/77 |
| 6,152,970 A | * | 11/2000 | Wei et al. ............. | 29/25.03 |

(Continued)

FOREIGN PATENT DOCUMENTS

| | | |
|---|---|---|
| CN | 101339848 | 1/2009 |
| CN | 101409154 | 4/2009 |

(Continued)

OTHER PUBLICATIONS

Machine Translation of KR10-0892154.

(Continued)

*Primary Examiner* — Yosef Gebreyesus
(74) *Attorney, Agent, or Firm* — John L. Haack; Michael W. Russell

(57) ABSTRACT

A method for fabricating an EDLC includes (a) coating a porous activated carbon material onto current collector sheets to form carbon-based electrodes, (b) drying the carbon-based electrodes, (c) winding or stacking carbon-based electrodes interleaved with separator sheets to fabricate a jelly roll or prismatic electrode assembly, (d) inserting the electrode assembly into a package and forming electrical connections between the electrode assembly and package terminals, (e) filling the package with a liquid electrolyte, and (f) sealing the package. Steps (a)-(f) are performed in an atmosphere having a low moisture content. The atmosphere may be vacuum or purged with dry gas.

10 Claims, 39 Drawing Sheets

(51) Int. Cl.
*H01G 11/28* (2013.01)
*H01G 13/04* (2006.01)

(56) References Cited

U.S. PATENT DOCUMENTS

| | | | |
|---|---|---|---|
| 6,379,402 B1 | 4/2002 | Suhara et al. | 29/25.03 |
| 6,466,428 B1* | 10/2002 | Wei | H01G 9/155 361/502 |
| 6,740,447 B1* | 5/2004 | Keshishian | 429/178 |
| 6,847,517 B2 | 1/2005 | Iwaida et al. | 361/502 |
| 7,057,879 B2 | 6/2006 | Iwaida et al. | 361/502 |
| 7,147,674 B1* | 12/2006 | Zhong et al. | 29/25.03 |
| 7,407,520 B2* | 8/2008 | Farahmandi | H01G 9/155 257/E21.008 |
| 7,907,387 B2 | 3/2011 | Aubert et al. | 361/502 |
| 8,427,812 B1 | 4/2013 | Stenger-Smith et al. | 361/502 |
| 2005/0250011 A1* | 11/2005 | Mitchell et al. | 429/217 |
| 2006/0146475 A1* | 7/2006 | Zhong | H01G 9/155 361/301.1 |
| 2006/0159999 A1* | 7/2006 | Kejha | H01M 2/1673 429/254 |
| 2008/0050570 A1 | 2/2008 | Drevet et al. | 428/219 |
| 2008/0209876 A1* | 9/2008 | Miller | G11C 13/0009 55/522 |
| 2009/0180238 A1* | 7/2009 | Gallay | H01G 9/0029 361/523 |
| 2012/0321913 A1 | 12/2012 | Hua et al. | 429/7 |
| 2013/0026978 A1* | 1/2013 | Cooley et al. | 320/107 |
| 2013/0230751 A1* | 9/2013 | Shaw | H01G 11/12 429/72 |
| 2013/0286542 A1 | 10/2013 | Madiberk et al. | 361/502 |

FOREIGN PATENT DOCUMENTS

| | | |
|---|---|---|
| CN | 101582334 | 11/2009 |
| CN | 101714466 | 5/2010 |
| CN | 102354619 | 2/2012 |
| CN | 102354620 | 2/2012 |
| CN | 102820136 | 12/2012 |
| JP | 06-275468 | 9/1994 |
| JP | 11008169 | 1/1999 |
| JP | 11102845 | 4/1999 |
| JP | 2000-049052 | 2/2000 |
| JP | 2000331882 | 11/2000 |
| JP | 2001274043 | 10/2001 |
| JP | 2002-249307 | 9/2002 |
| JP | 2003/115422 | 4/2003 |
| JP | 2006269739 | 10/2006 |
| JP | 2008147283 | 6/2008 |
| JP | 04125840 | 7/2008 |
| JP | 2012109373 | 10/2012 |
| KR | 10-0892154 | 4/2009 |

OTHER PUBLICATIONS

Machine Translation of JP2000-049052.
Machine Translation of JP2002-249307.
PCT/US2014/063982 Search Report and Written Opinion.

* cited by examiner

ULTRACAPACITOR VACUUM ASSEMBLY

BACKGROUND

1. Field

The present disclosure relates generally to a system and methods for forming an ultracapacitor, and more specifically to a vacuum assembly for forming ultracapacitors such as electrochemical double layer capacitors (EDLCs).

2. Technical Background

Energy storage devices such as ultracapacitors may be used in a variety of applications such as where a discrete power pulse is required. Example applications range from cell phones to hybrid vehicles. Ultracapacitors such as electrochemical double layer capacitors (EDLCs) have emerged as an alternative or compliment to batteries in applications that require high power, long shelf life, and/or long cycle life. Ultracapacitors typically comprise a porous separator and an organic electrolyte disposed between a pair of carbon-based electrodes. The energy storage is achieved by separating and storing electrical charge in the electrochemical double layers that are created at the interfaces between the electrodes and the electrolyte. Important characteristics of these devices are the energy density and power density that they can provide, which are both largely determined by the properties of the carbon that is incorporated into the electrodes and the liquid electrolyte.

It would be advantageous to provide manufacturing methods and associated apparatus for fabricating efficient, long-life and high energy density devices.

BRIEF SUMMARY

In accordance with embodiments of the present disclosure, a method for fabricating an electrochemical double layer capacitor includes one or more assembly steps performed under controlled atmosphere conditions, such as in a vacuum chamber. An apparatus for fabricating an electrochemical double layer capacitor includes a chamber such as a vacuum chamber that is configured to perform one or more of the acts of (a) coating a porous activated carbon material onto a metallic current collector sheet, for example using a tape casting process, to form carbon-based electrodes, (b) drying the carbon-based electrodes, for example, to eliminate water, (c) winding or stacking carbon-based electrodes interleaved with separator sheets to fabricate a jelly roll or prismatic electrode assembly, (d) inserting the electrode assembly into a package and forming electrical connections between the electrode assembly and terminals at the exterior of the package, (e) filling the package with a liquid electrolyte, and (f) sealing the package.

The disclosed method and apparatus can be used to form electrochemical double layer capacitors having a water content of less than 500 ppm, e.g., less than 200 or less than 100 ppm.

Additional features and advantages of the subject matter of the present disclosure will be set forth in the detailed description which follows, and in part will be readily apparent to those skilled in the art from that description or recognized by practicing the subject matter of the present disclosure as described herein, including the detailed description which follows, the claims, as well as the appended drawings.

It is to be understood that both the foregoing general description and the following detailed description present embodiments of the subject matter of the present disclosure, and are intended to provide an overview or framework for understanding the nature and character of the subject matter of the present disclosure as it is claimed. The accompanying drawings are included to provide a further understanding of the subject matter of the present disclosure, and are incorporated into and constitute a part of this specification. The drawings illustrate various embodiments of the subject matter of the present disclosure and together with the description serve to explain the principles and operations of the subject matter of the present disclosure. Additionally, the drawings and descriptions are meant to be merely illustrative, and are not intended to limit the scope of the claims in any manner.

BRIEF DESCRIPTION OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
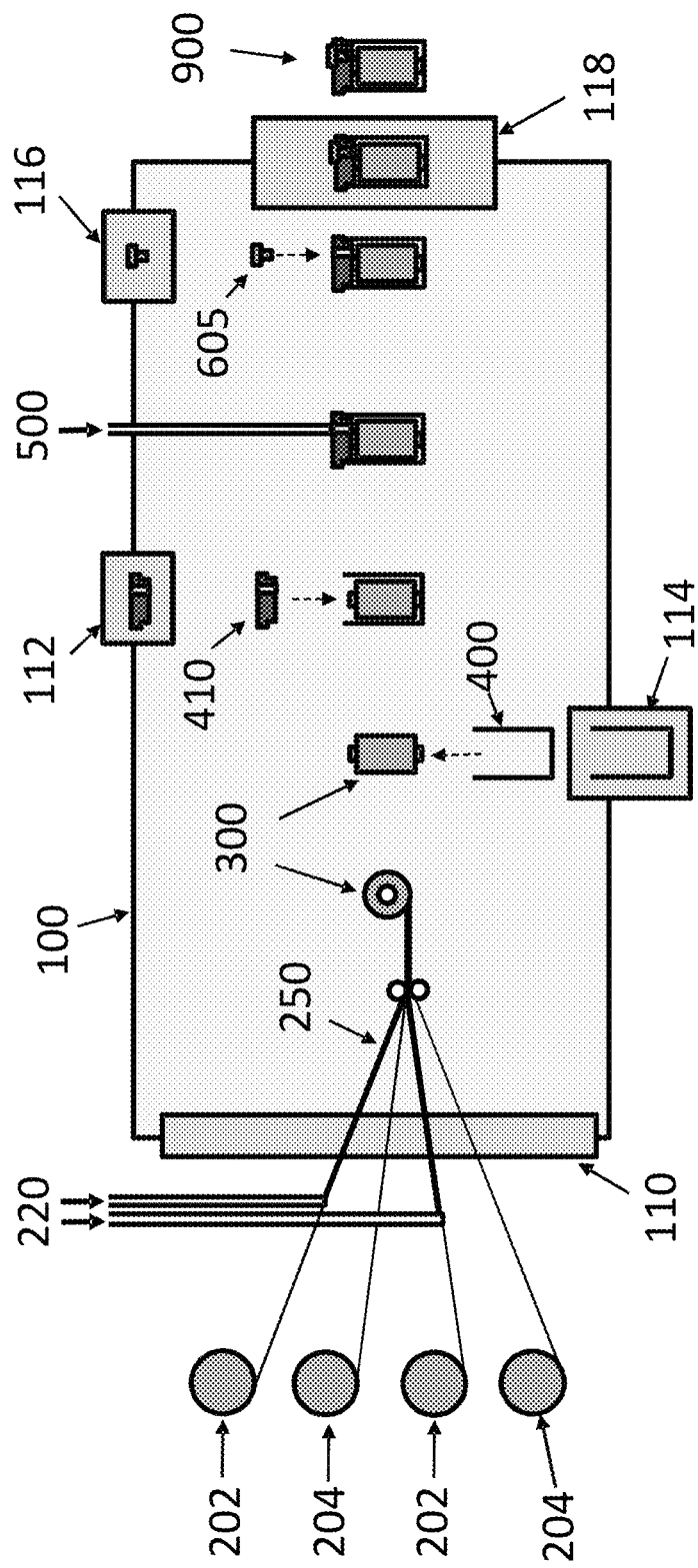
FIG. 1 is a schematic diagram illustrating fabrication of an ultracapacitor within a vacuum chamber according to embodiments.

Reference will now be made in greater detail to various embodiments of the subject matter of the present disclosure, some embodiments of which are illustrated in the accompanying drawings. The same reference numerals will be used throughout the drawings to refer to the same or similar parts.

An example method for fabricating an EDLC comprises (a) coating a porous activated carbon material onto current collector sheets to form carbon-based electrodes, (b) drying the carbon-based electrodes, (c) winding or stacking carbon-based electrodes interleaved with separator sheets to fabricate a jelly roll or prismatic electrode assembly, (d) inserting the electrode assembly into a package and forming electrical connections between the electrode assembly and package terminals, (e) filling the package with a liquid electrolyte, and (f) sealing the package.

The disclosed assembly process, which is implemented under controlled atmosphere or vacuum conditions, minimizes the introduction or retention of water into the EDLC package. The presence of water in an operating device containing organic electrolytes can adversely affect performance and service life. Water is typically used to form the tape casting slurry, for example, and may be adsorbed into the pores of the carbon-based electrodes. Thus, residual water may be removed by processing under controlled ambient conditions, including a drying step.

If not removed from the cell, water may cause undesired hydrolysis of the electrolyte salt. In the example of tetraethyl ammonium tetrafluoroborate, hydrolysis may proceed according to $(C_2H_5)_4N^+BF_4^- + H_2O \rightarrow (C_2H_5)_4N^+OH^- + HBF_4$. The quaternary ammonium hydroxide generated via hydrolysis may further decompose under conditions of elevated temperature or elevated voltage to produce additional water according to $(C_2H_5)_4N^+OH^- \rightarrow C_2H_4 + (C_2H5)_3N + H_2O$. Also, hydrofluoric acid (HF) may be formed via hydrolysis of the tetrafluoricboric acid ($HBF_4$).

Drying can be performed at various stages of the fabrication process. Drying includes heating the component(s) to be dried. The drying may include vacuum drying. In embodiments, individual electrode and current collector sheets are dried prior to lamination and winding. In embodiments, carbon-based electrodes (i.e., an activated carbon/current collector laminate) are dried prior to winding. In embodiments, jelly roll electrodes are dried, i.e., after the winding, before or after inserting the jelly roll into the package.

The disclosed ultracapacitor assembly process enables rapid and continuous fabrication. By conducting at least one assembly step in a controlled atmosphere chamber or vacuum chamber, the presence of water within the device can be substantially minimized. Vacuum processing can significantly decrease drying times, for example. In embodiments, one or more of (a) current collector coating, (b) drying, (c) winding/stacking, (d) packaging and forming electrical connections, (e) filling, and (f) sealing are performed in vacuum. In an example, steps (a)-(f) are carried out under controlled atmosphere conditions (e.g., vacuum). In a further example, current collectors are coated under ambient or controlled ambient conditions and the carbon-based electrodes formed by the coating are fed into a vacuum chamber where the subsequent steps (b)-(f) are carried out under vacuum. In a still further example, at least the acts of (b) drying and (e) filling are carried out under vacuum. The vacuum assembly can significantly decrease the incorporation of contaminants into the EDLC. In embodiments, the disclosed methods rapidly remove water from carbon-based electrodes prior to winding and inhibit reintroduction of water during subsequent processing steps. In embodiments, the acts of (a) current collector coating, (b) drying, (c) winding/stacking, (d) packaging and forming electrical connections, (e) filling, and (f) sealing are performed without breaking vacuum, e.g., such that vacuum is continuously maintained between, for example, the acts of drying and filling.

According to embodiments, an electrochemical cell comprises a first carbon-based electrode and a second carbon-based electrode arranged within a package, wherein each carbon-based electrode includes a current collector having opposing first and second major surfaces, a first conductive layer is formed over the first major surface, a second conductive layer is formed over the second major surface, and a first carbon-based layer and a second carbon-based layer each comprising activated carbon, carbon black and binder are formed over respective ones of the first and second conductive layers.

A schematic overview, according to various embodiments, of an ultracapacitor fabrication process within a vacuum chamber 100 is illustrated in FIG. 1. Current collector sheets 202 and separator sheets 204 are mounted, for example as rolled sheet, external to vacuum chamber 100. Activated carbon material 220 is coated onto the current collector sheets 202 as the current collector sheets 202 and separator sheets 204 are fed into the vacuum chamber through a load lock 110. The activated carbon material 220 may be in direct physical contact with the current collector sheets 202 or, in embodiments, an interfacial layer such as a layer of conductive carbon may be provided at the interface between the activated carbon material and the current collector sheets. The current collector can be, for example, a 15-25 μm (e.g., 20 micron) thick aluminum foil that is optionally pre-coated with a layer of conductive carbon such as carbon ink (e.g., DAG EB012) conductive coating from Henkel (formerly Acheson) or thermally-grown carbon.

Load locks 110, 112, 114, 116 and 118 are provided at various locations of the vacuum chamber 100 to allow piece parts and finished devices to be passed in and out of the vacuum chamber 100 while maintaining controlled atmosphere or vacuum conditions within the chamber.

Inside the vacuum chamber the carbon-based electrode 250 is dried and then wound with separator material to form a jelly roll electrode 300. Drying of the carbon-based electrodes can be performed while the electrodes are in a planar or near planar configuration. This enables efficient (more complete) removal of water from the electrode materials, as it is not trapped within a wound jelly roll.

After winding, the jelly roll electrode 300 is packaged by inserting it into a can 400. Electrical connections are made and the can is enclosed with a cap 410. The package is filled with liquid electrolyte 500 and sealed with seal 605, e.g., under vacuum. The ultracapacitor 900 exits the vacuum chamber 100 through load lock 118.

During operation, the vacuum chamber can have a base pressure of less than $10^{-1}$ torr, e.g., $10^{-5}$ to $10^{-1}$ torr. In embodiments, the water content in the vacuum chamber is less than 200 ppm, e.g., less than 200, 100, 50, 20, 10, 5, 2, or 1 ppm. In embodiments, the water content in the vacuum chamber is zero ppm.

In embodiments, rapid loading and unloading of ultracapacitor components via load locks 110, 112, 114, 116 and 118 is enabled by turbomolecular pumps, which can achieve pumping speeds over a wide range (e.g., 70-6000 liter/s). In embodiments, a single part or multiple parts may be fed through a load lock at the same time.

Aspects of the fabrication process are discussed below, and include (a) forming a carbon-based electrode, (b) drying, (c) winding/stacking, (d) packaging and forming electrical connections, (e) filling, and (f) sealing. Unless otherwise stated, it is not intended that specific steps be performed in a specific order. For example, it will be appreciated that one or more drying steps may be performed at different stages of the fabrication process, e.g., after current collector coating but before winding/stacking, and after filling but before sealing.

Current Collector Coating

Carbon-based electrodes 250 are formed by coating a current collector with activated carbon material 220. The current collector typically comprises an electrically-conductive sheet or foil such as aluminum foil. Particles of activated carbon are generally mixed with an organic binder (e.g., PTFE particles) and water or other liquid to form a spreadable paste or slurry. A thin layer (e.g., 150-200 um) comprising activated carbon is applied on one or both sides of a current collector (see, e.g., FIGS. 2A-B), for example, using slot coating or a doctor blade. Alternatively, a sheet of carbon material may be formed separately and laminated onto a current collector sheet. The coated current collector may be dried through evaporation of the water or other liquid component(s). In addition to polytetrafluoroethylene (PTFE), example organic binders include self-binding polymers (SBPs), carboxymethyl cellulose (CMC), polyvinylidene difluoride (PVDF) and polyvinyl alcohol (PVA).

The activated carbon layer may be applied to the current collector inside of the vacuum chamber or outside of the vacuum chamber. Coating outside the vacuum chamber has the advantage that the process can be easily monitored and adjusted. Coating inside of the vacuum chamber can minimize exposure to impurities and enable rapid drying of the deposited layer. The current collector may comprise discrete current collector sheet sections or a continuous current collector sheet. Methods of forming carbon-based electrodes and conveying carbon-based electrodes into the vacuum chamber are illustrated schematically in FIGS. 2-6 according to various embodiments.

Figure 2A:
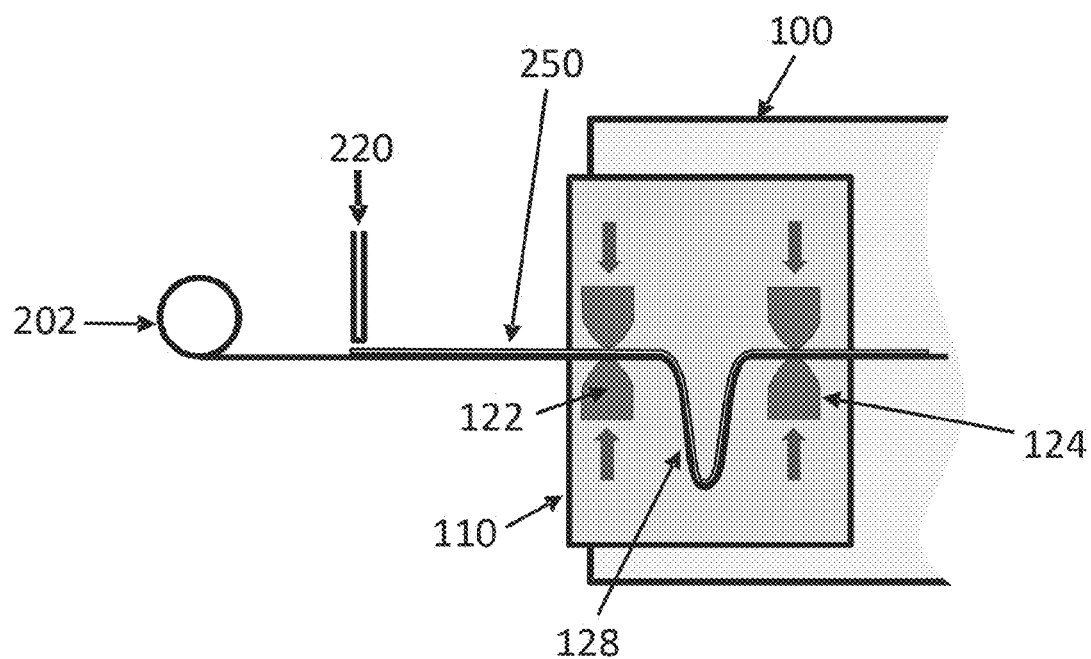
FIGS. 2A-B are drawings of a current collector-electrode load lock implemented using gate seals.
Figure 2B:
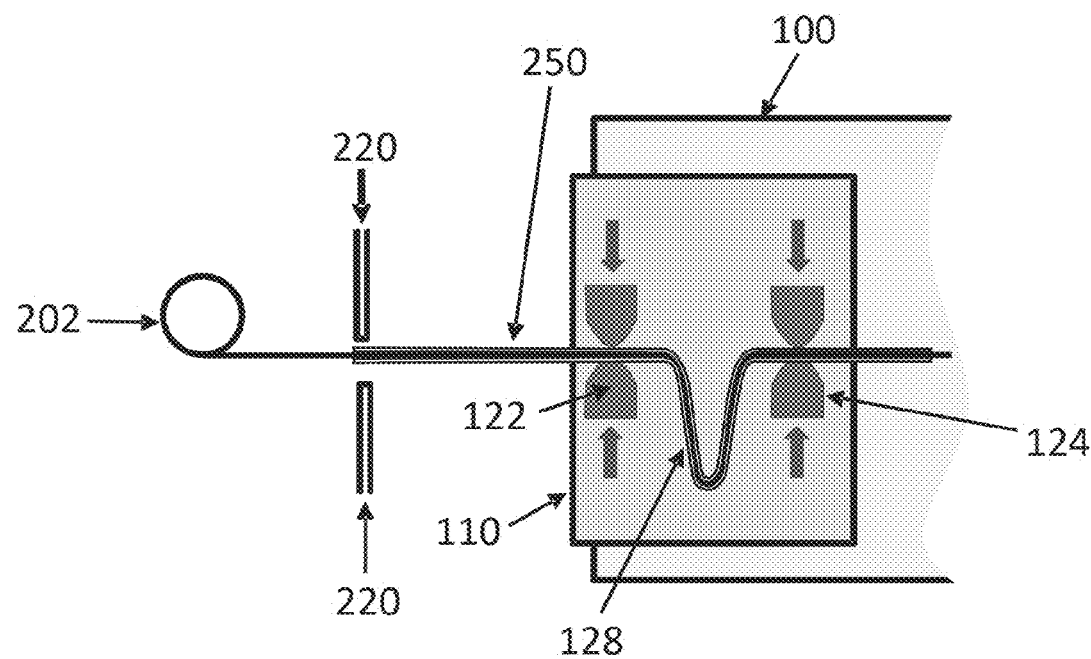

With reference to FIGS. 2A-B, activated carbon material 220 may be may applied to one side (FIG. 2A) or both sides (FIG. 2B) of an uncut continuous current collector sheet 202 outside the vacuum chamber 100. In the illustrated embodiment, the vacuum chamber load lock 110 includes an input gate 122 and an output gate 124, which form a seal around the coated current collector and allow the carbon-based electrode 250 to be fed into the vacuum chamber either continuously or in discrete segments without damaging the carbon-based electrode or compromising the atmosphere within the chamber vacuum.

Gates 122, 124 may apply pressure to the carbon based electrode 250, for example, via a deformable gasket that forms a leak-free seal. The load lock 110 may include a storage region 128 that allows the carbon-based electrode to be continuously fed into the load lock 110 (e.g., while the input gate 122 is open and the output gate 124 is closed) and removed (e.g., after load lock pump down, while the input gate 122 is closed and the output gate 124 is open).

Figure 3:
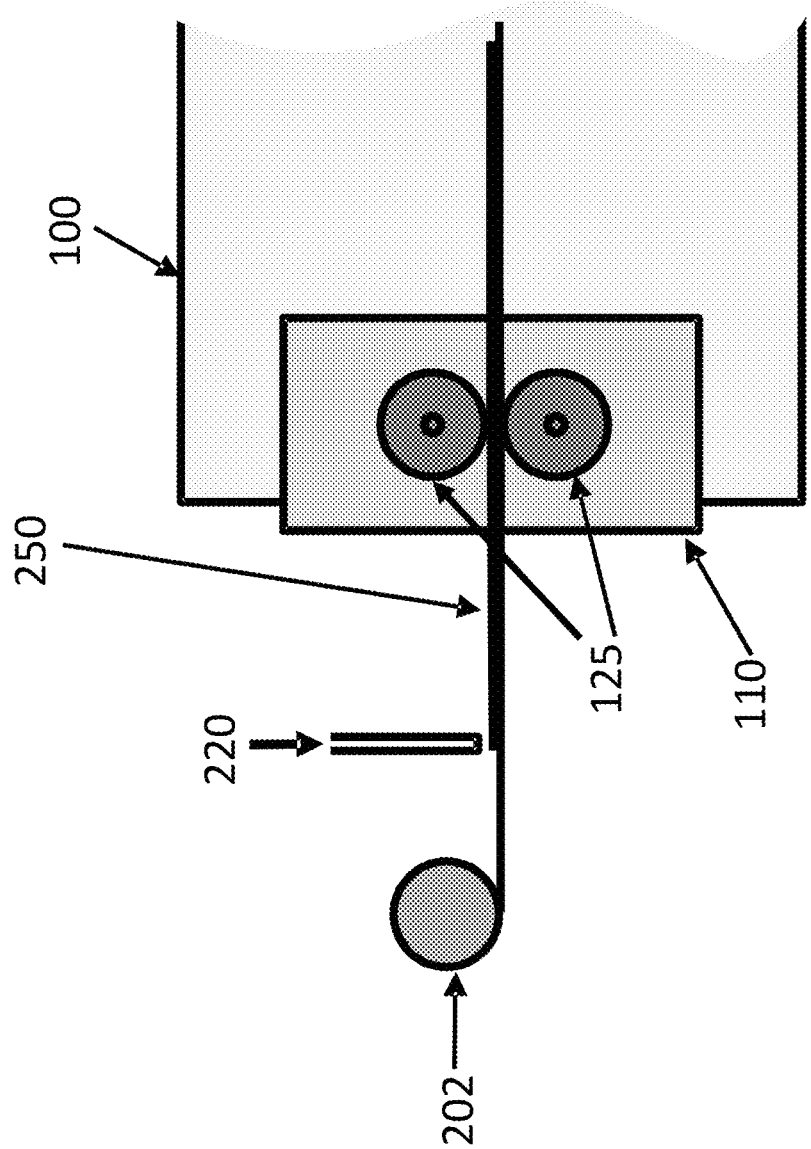
FIG. 3 is a drawing of a current collector-electrode load lock implemented using roller seals.

As an alternative to a load lock 110 comprising gates 122, 124, in an embodiment a carbon-based electrode is fed into a vacuum chamber via rollers 125. The rollers 125 as shown in FIG. 3 may be stepped and/or provided with an elastomeric or otherwise compressible surface so as to form a seal to the carbon-based electrode 250 as it passes between the rollers without damaging or deforming the carbon-based electrode. The rollers 125 may be heated in order to dry the carbon-based electrode 250.

Figure 4:
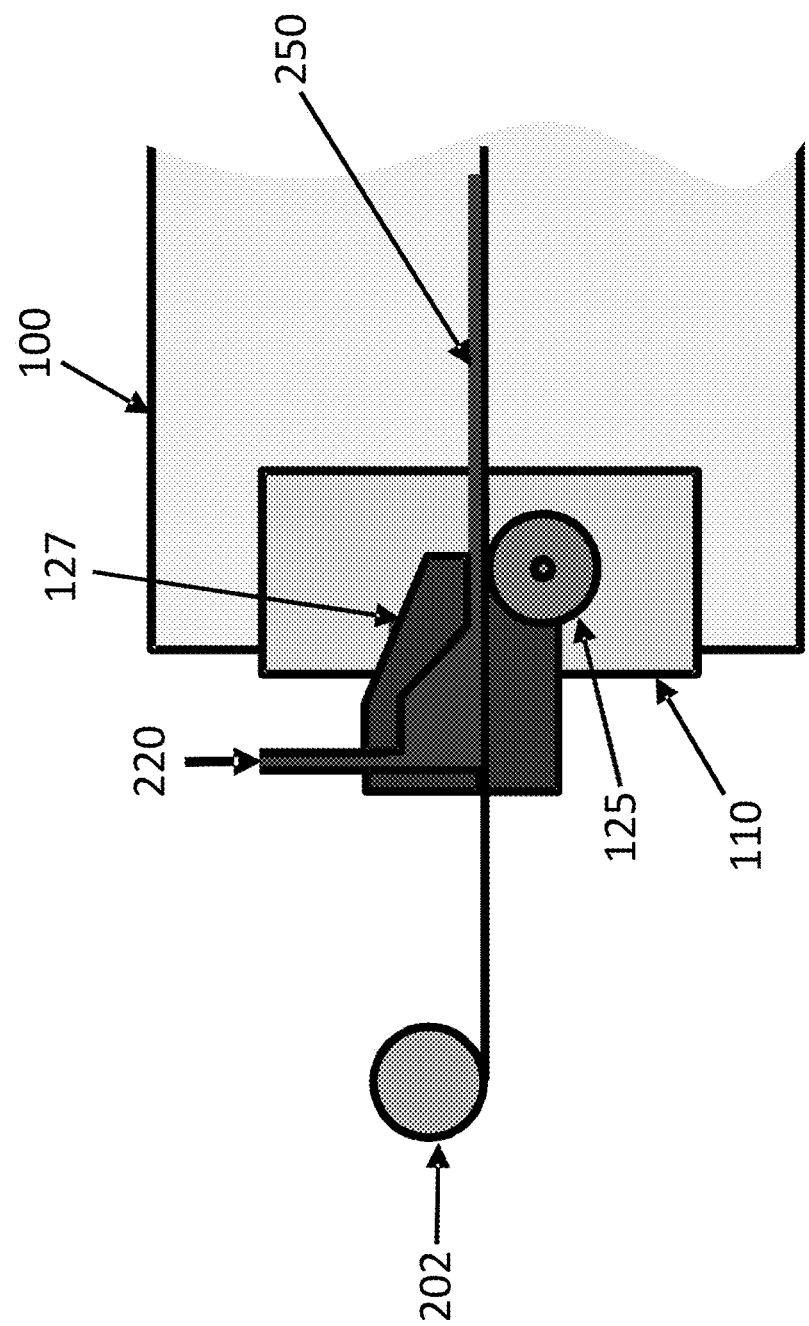
FIG. 4 is a drawing of a current collector-electrode load lock implemented using a slot extrusion die.

Turning to FIG. 4, in a further embodiment a slot die 127 is used in conjunction with roller 125 to coat a current collector sheet 202. All or a portion of the slot die may be housed within a load lock 110, which cooperate to provide a vacuum seal for the vacuum chamber 100.

Figure 5:
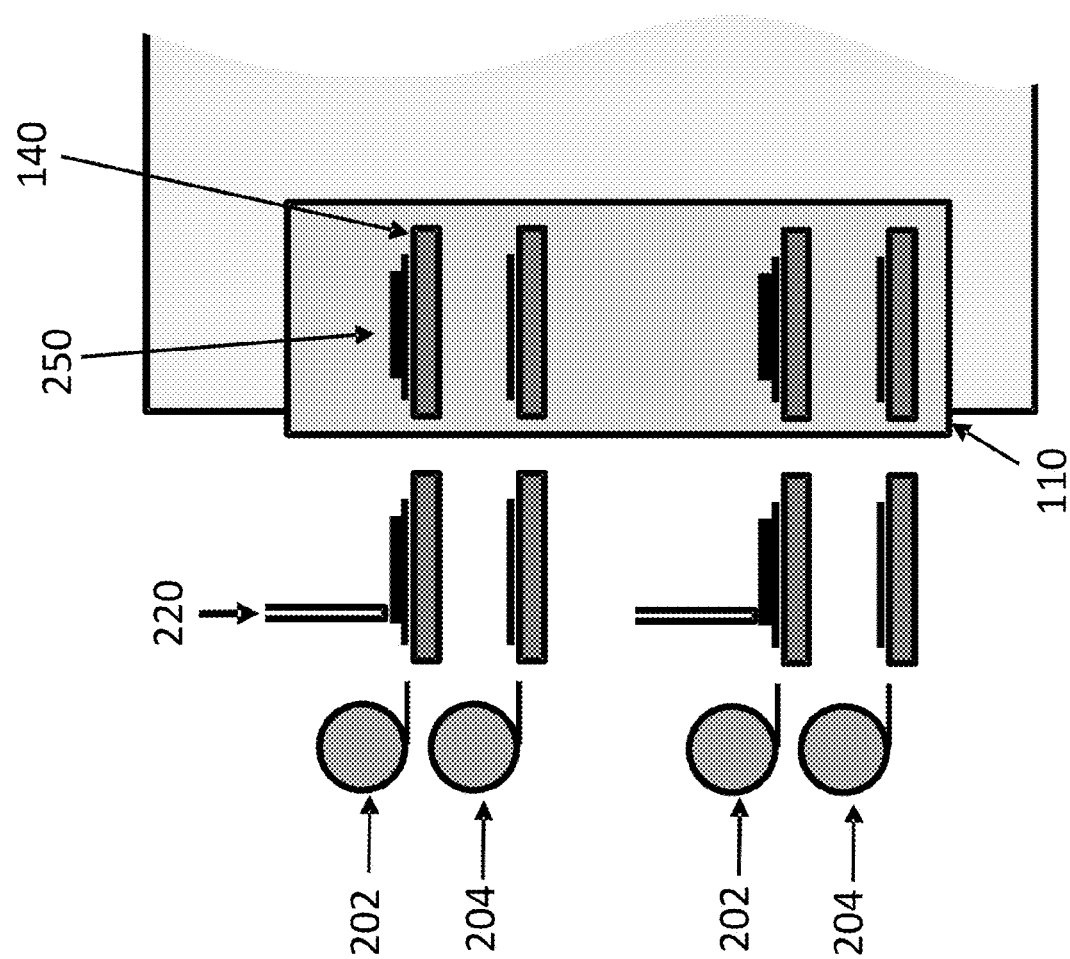
FIG. 5 is a drawing showing transportation of carbon-based electrodes into a vacuum chamber on discrete carriers.

In embodiments, as illustrated in FIG. 5, the current collector sheets 202 and the separator sheets 204 may be cut into segments and supported on carriers 140. Each current collector segment is coated with activated carbon material 220 and then fed into the vacuum chamber via load lock 110 one-by-one or in batches. In such an approach the carbon-based electrodes 250 may remain flat as they pass through the load lock, which minimizes the likelihood for dimensional distortion. In example embodiments, suitable coating means include a slot die and a laminator.

In each of the coating/sealing embodiments illustrated in FIGS. 2-6, the respective load lock 110 may be configured in multiple zones, with one or more seals used to transition from a first environment outside the vacuum chamber to a second environment inside the vacuum chamber. For example, a first environment may comprise a first base pressure and a second environment may comprise a second base pressure that is greater than or less than the first base pressure. In a further example, a first environment may comprise a first gas atmosphere and a second environment may comprise a second gas atmosphere that is different than the first gas atmosphere. Dry gases, such as dry argon or dry nitrogen may be used.

Figure 6:
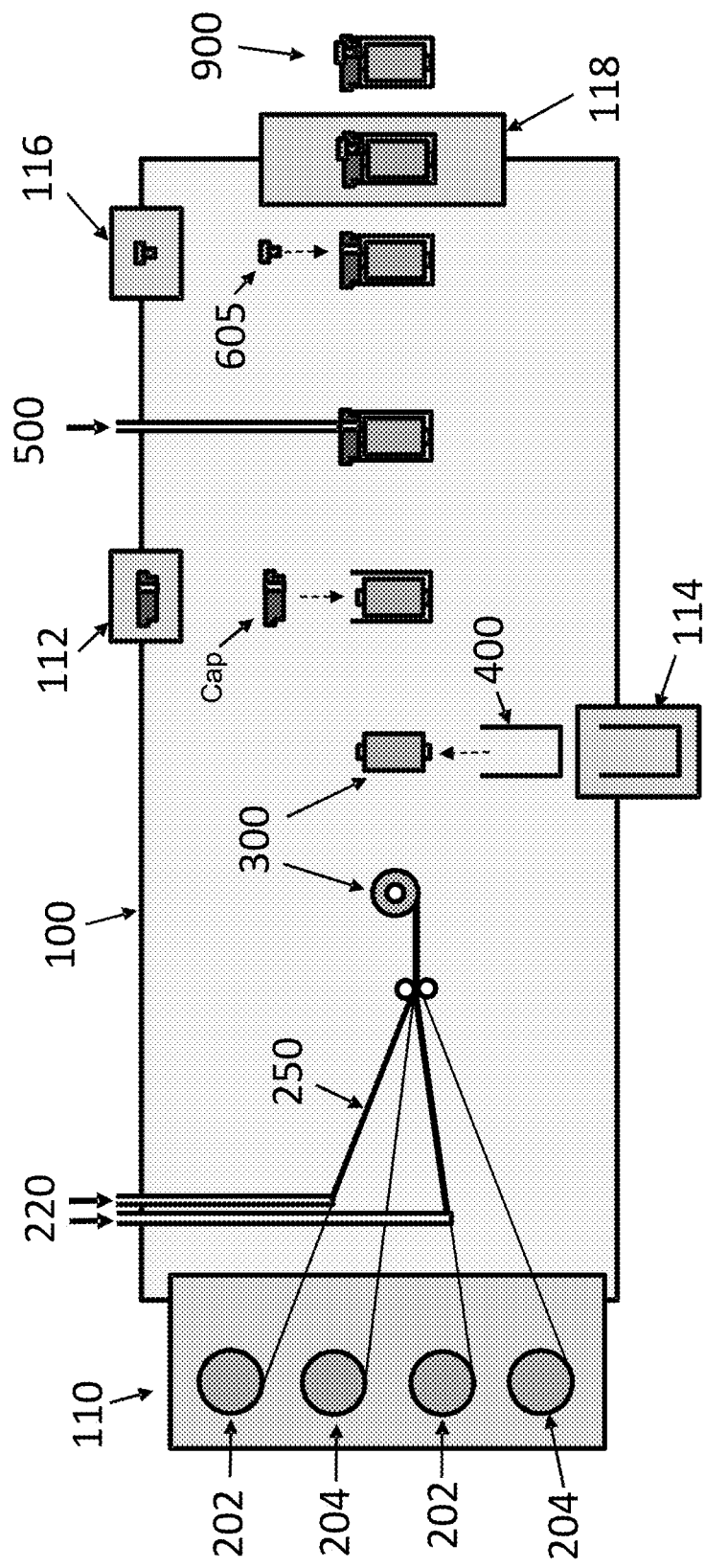
FIG. 6 is a schematic diagram illustrating fabrication of an ultracapacitor within a vacuum chamber according to further embodiments.

FIG. 6 illustrates an embodiment where current collector sheets 202 and separator sheets 204 are contained within load lock 110. In this configuration, the load lock may be cycled only periodically, such as when a roll is to be replaced.

Drying

Figure 7:
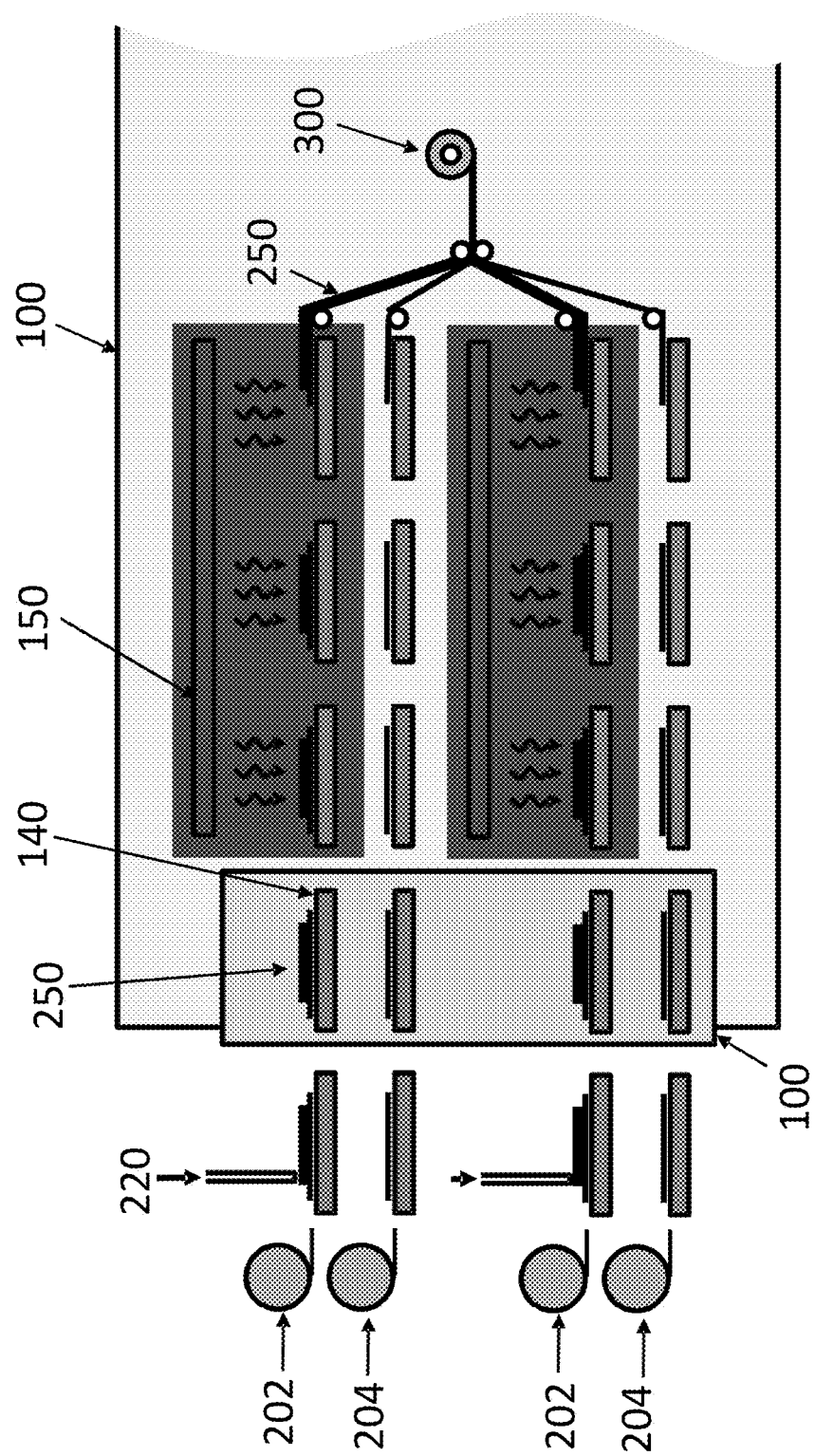
FIG. 7 illustrates the drying of carbon-based electrodes with a vacuum chamber.

In embodiments, carbon-based electrodes 250 are dried in an atmosphere comprising at most 200 ppm water (e.g., 200, 100, 50, 20, 10, 5, 2, 1 or 0 ppm water). Such an atmosphere may be purged with a dry gas, such as argon or nitrogen. In embodiments, carbon-based electrodes 250 are dried under vacuum. As illustrated in FIG. 7, heat may be applied to the carbon-based electrodes 250 by passing them by a heater 150. Example heating means include a lehr or tunnel furnace. The drying can be carried out on continuous or discrete current collector sheets, though as mentioned above, continuous sheet processing may provide an advantage by reducing size and eliminating management of discrete carriers within the vacuum chamber.

Heating to affect drying may be carried out in one or multiple heating zones, where the heating zones may have different lengths and/or are maintained at different temperatures. Plural heating zones may be separated by additional load locks (not shown), so that the pressure surrounding the heated current collector/electrode sheets can be modified as the rate of water removal changes. This approach would also limit the potential for water that is liberated from current collector/electrode sheets from contaminating dried electrode materials located downstream from the drying step.

Winding/Stacking

After the drying step, the carbon-based electrodes 202 and separator sheets 204 are interleaved and winding means are used to wrap the electrode and separator sheets around a mandrel to form a jelly roll electrode 300. In jelly roll electrode winding, the electrode material experiences a force as it is wound, resulting in a compact electrode.

In embodiments, winding to form a jelly roll electrode is performed after drying the electrode material. Further drying may be performed after the winding.

Packaging/Forming Electrical Connections

Figure 8:
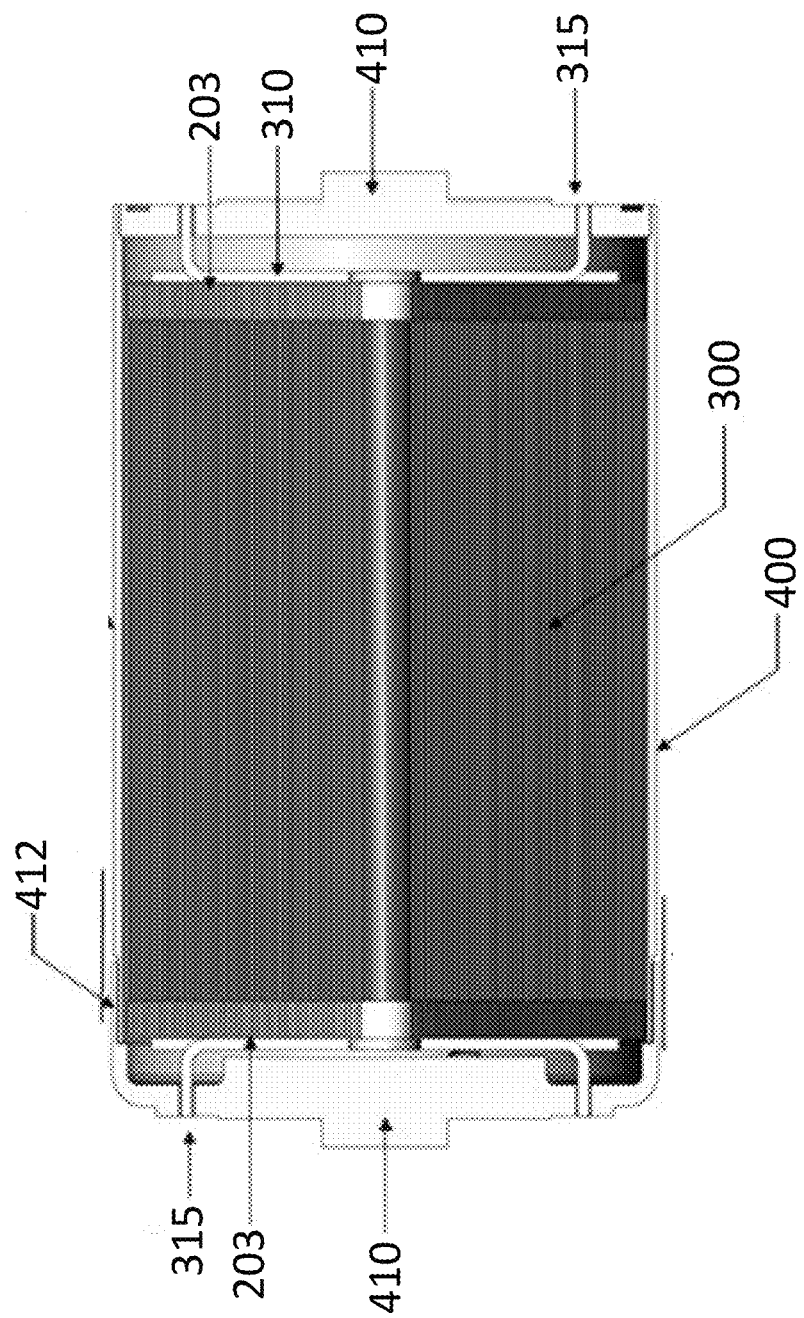
FIG. 8 is a cross-sectional diagram of an ultracapacitor having a jellyroll design.
Figure 9:
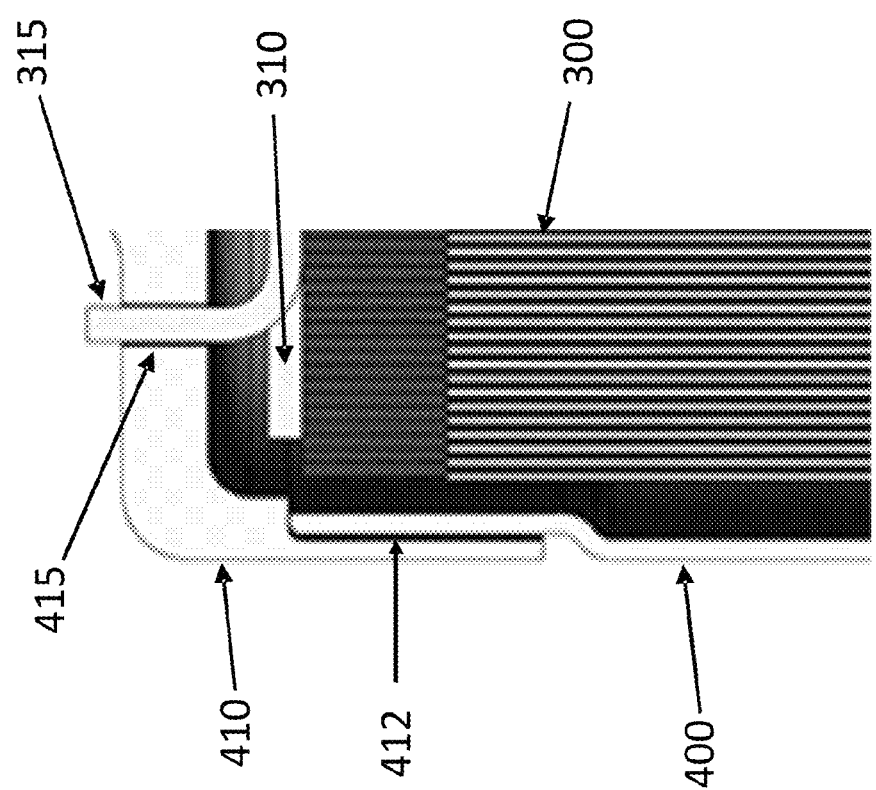
FIG. 9 is a cross-sectional view of a terminal plate with bent leads.

The jelly roll electrode 300 is packaged into a can 400. Aspects of the packaging include (a) electrically-connecting terminal plates to the jelly roll electrode, (b) inserting the jelly roll assembly into the can, and (c) connecting terminal plate leads to the can. Cross-sectional drawings of an EDLC package are shown in FIGS. 8 and 9.

The electrical connection between the jelly roll electrode and the exterior of the package includes terminal plates 310 that are joined (e.g., welded) to both ends of the jelly roll 300. The terminal plates 310 provide a broad surface that contacts the ends 203 of the jelly roll (i.e., extended portions of the current collectors) over a large area. Welding of the terminal plates to the jelly roll may be performed, for example, by laser welding, or electron beam welding. In embodiments, welding is performed in vacuum. In embodiments, the terminal plates are brazed to the jelly roll electrode. By way of example, a terminal plate-jellyroll electrical connection can be made by placing conductive material at the interface between the two parts and melting the material, which flows to wet and join both parts. A conductive material may include an Al—Si alloy, for example.

In embodiments, one or both of the terminal plates are omitted and the electrode jelly roll is joined directly to the can or end cap, for example, using an Al—Si alloy.

Once the terminal plates 310 are attached to the electrode jelly roll 300, the assembly is inserted into an ultracapacitor can 400. In embodiments, a sealant 412 such as a layer of epoxy is applied to the outside rim of the can, and then an end cap 410 is applied so that the terminal plate leads 315 project through the end cap apertures 415. The epoxy can be thermally cured so that it provides a mechanically robust, leak-free and electrically-insulating joint between the package end cap 410 and the can 400.

Figure 10:
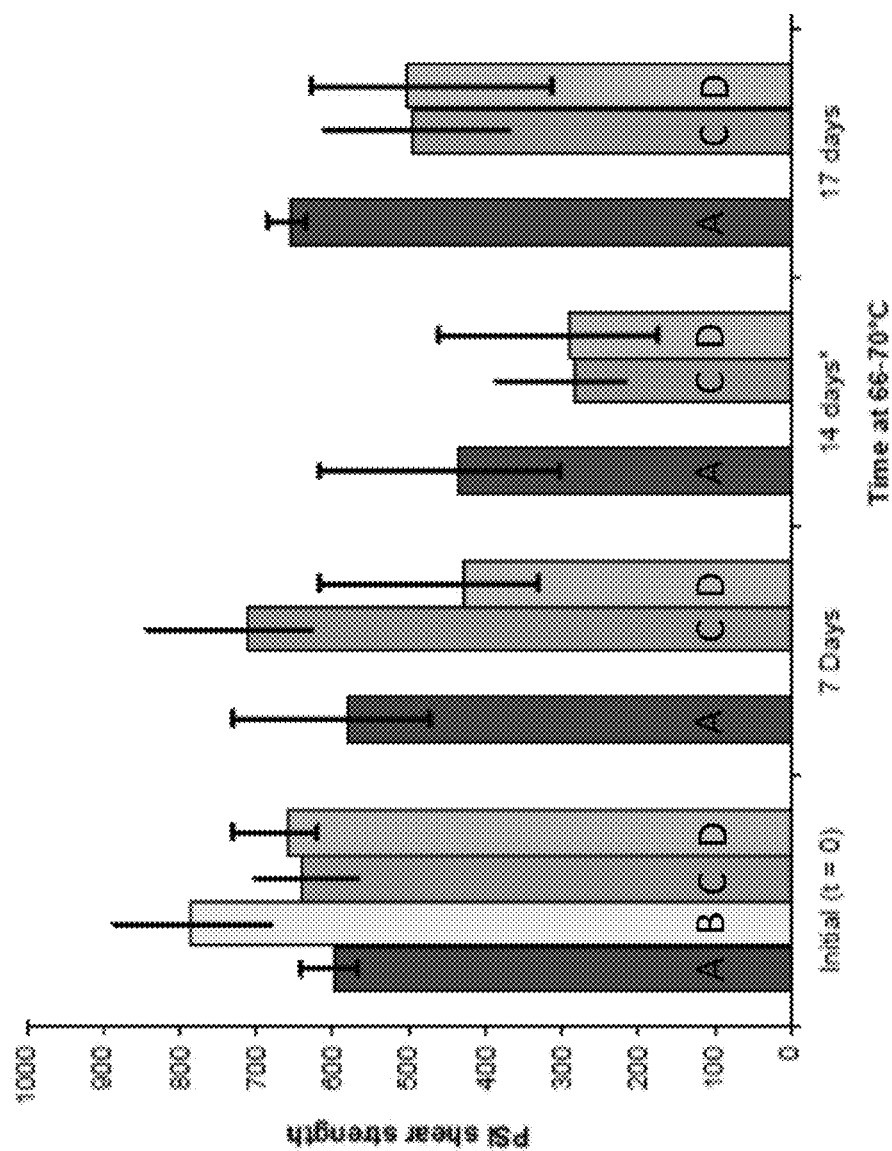
FIG. 10 is a plot of shear strength versus time for various epoxy resins.

An estimated shear stress for the epoxy joint is given as $200(0.25)\pi(2.2952)/(\pi(2.350)(0.28))=400$ lb/in$^2$ at the target maximum operating pressure of 200 psig. Several epoxies (A-D) were evaluated for shear stress performance under exposure to acetonitrile at 66-70° C. for various durations. The results, which are summarized in FIG. 10, indicate shear stresses are in the range of 300-600 psi over a 17 day test. As much as a 50% improvement in epoxy shear strength was observed when the metal surfaces were roughened prior to applying the epoxy.

Epoxy candidates were exposed to two thermal cycle tests. The first test involved 10 cycles between −40° C. and +85° C. at 30 second/cycle. The second test involved 100 cycles between −40° C. and +85° C. at a ramp rate of 3° C./min. An unfilled epoxy yielded good results both for thermal cycling and thermal shock tests.

Terminal plates 310 include one or more integral leads 315 that may be bent (e.g., at 90 degrees relative to the plane of the terminal plate 310). The leads 315 are configured to project through apertures 415 in the end caps 410 and can 400, which enables them to be joined to the package using a subsequent welding step.

Figure 11B:
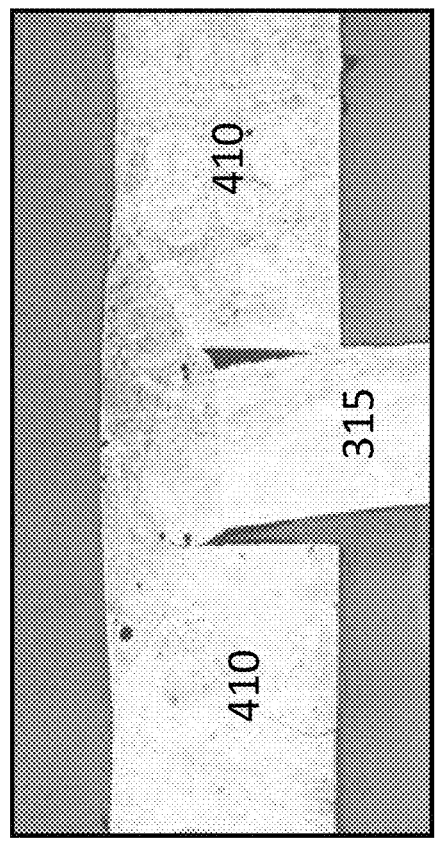
FIG. 11B is an optical micrograph of a welded terminal plate.
Figure 11A:
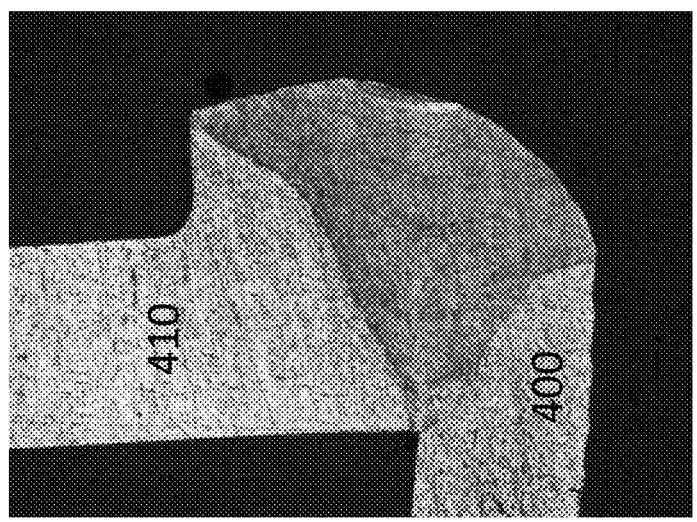
FIG. 11A is an optical micrograph of a welded end cap.

In an embodiment, once the end cap and can are joined with epoxy, the terminal plate leads 315 are joined to the end cap 410 and can 400 via laser welding or electron beam welding under vacuum. In a further embodiment, the terminal plate leads 315 are joined to the end cap 410 and can 400 prior to joining the end cap and the can with epoxy. A cross-sectional view of end cap 410 welded to the can 400 is shown in FIG. 11A. A cross-sectional view of a terminal plate lead 315 welded to the end cap 410 is shown in FIG. 11B. After welding, the package may be subjected to a leak test to confirm that all welded joints are leak-free. The leak test may also be incorporated during or after additional downstream assembly processes such as electrolyte filling and package sealing.

Filling

Figure 12:
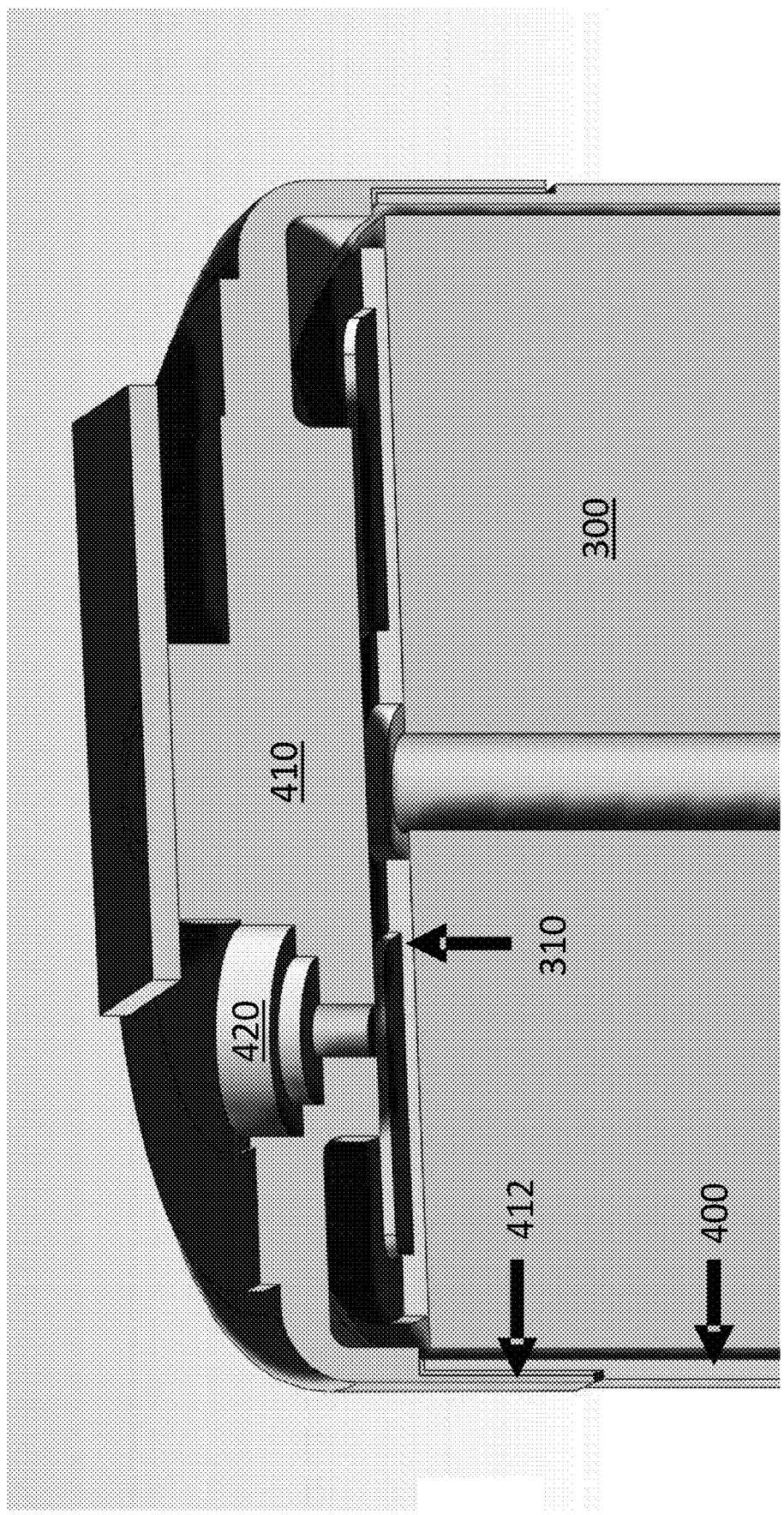
FIG. 12 is a cross-sectional schematic view of a jellyroll ultracapacitor showing the fill port.

With reference to FIG. 12, the ultracapacitor is filled with liquid electrolyte through an end cap fill port 420. In embodiments, a fill tube (not show) is inserted into the fill port such that a seal around the periphery of the fill tube makes a leak-free seal with the fill port. Electrolyte flows from a container exterior to the vacuum chamber through the fill tube and into the ultracapacitor package. Atmospheric pressure external to the vacuum chamber forces the electrolyte into the cavities and pores within the package. In embodiments, the ultracapacitor is filled with liquid electrolyte in an atmosphere comprising at most 200 ppm water (e.g., 200, 100, 50, 20, 10, 5, 2, 1 or 0 ppm water).

Sealing

Figure 13:
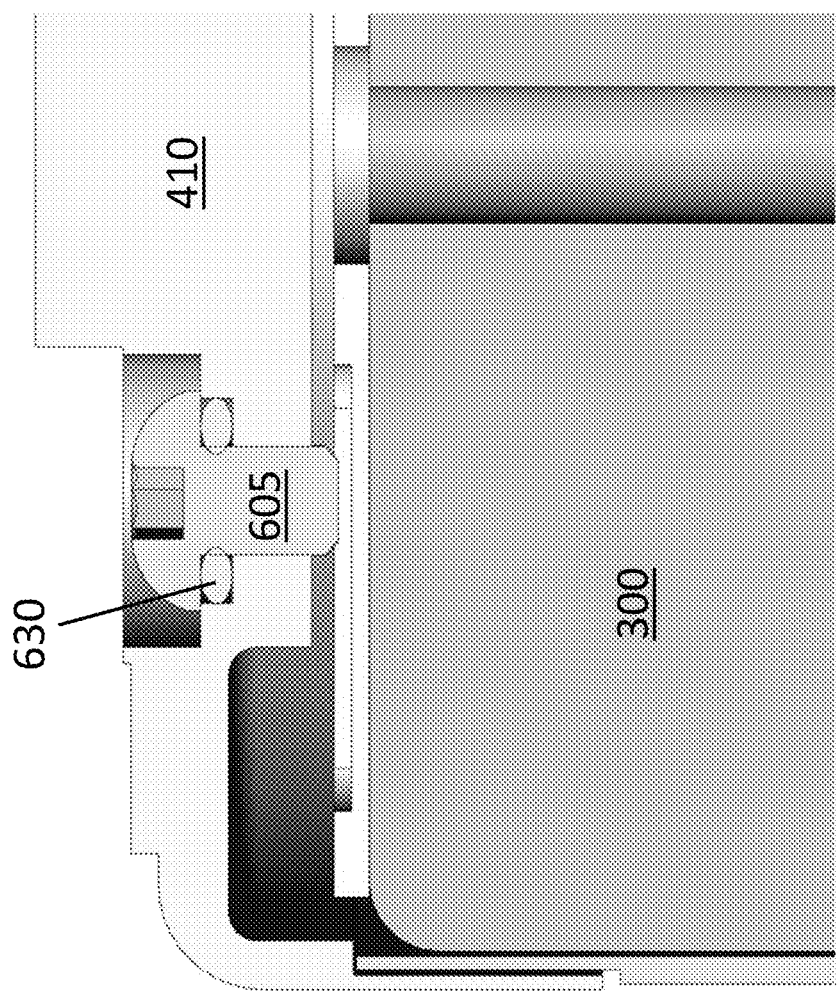
FIG. 13 is a cross-sectional schematic view of an ultracapacitor end-cap.

As shown in FIG. 13, an electrolyte filled ultracapacitor is sealed, e.g., under vacuum, using a sealing plug 605 that cooperates with an O-ring seal 630. Plug 605 may also provide pressure relief in the event that internal package pressures exceed a safe value.

In embodiments, the seal is formed by laser welding at the perimeter of a sealing plug. Such a "plug" may integral to the terminal plate lead that projects through an aperture such that the aperture is used to make an electrical connection between the electrode jelly roll and the package exterior, as well as for electrolyte filling.

After the ultracapacitor 900 is sealed, it exits the chamber via load lock 118.

The assembly process described above enables continuous ultracapacitor fabrication using multiple processing/assembly stations within one or more controlled atmosphere (e.g., vacuum) chambers.

According to further embodiments a fabrication method and apparatus uses a single work cell to assemble an ultracapacitor. A sequence of fabrication steps are described below with reference to FIGS. 14-39.

Figure 14:
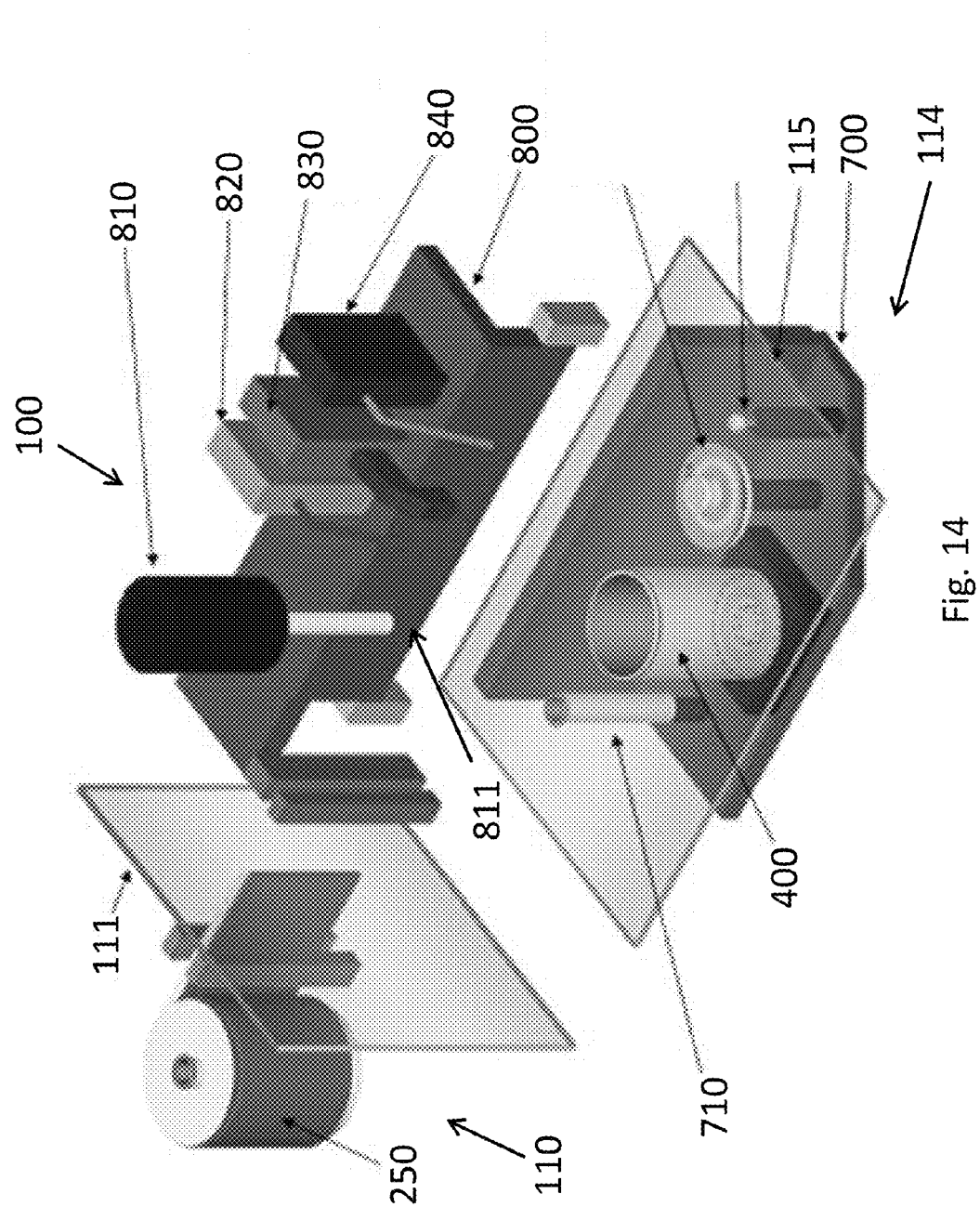
FIG. 14 shows an initial configuration of a vacuum chamber for forming an ultracapacitor.

As shown in the cut-away schematic of FIG. 14, a processing chamber includes two loads locks 110, 114, with corresponding load lock doors 111, 115. The first load lock 110 contains pre-wound rolls of electrode and separator materials 250. In this example carbon electrode material 220 has been previously applied to the current collector sheet 202, but it could also be applied to the current collector after it enters the vacuum chamber 100 (as shown in FIG. 6). The rolls can contain materials for plural ultracapacitor jelly roll windings so that the total number of load lock pump downs can be reduced.

The second load lock 114 contains a parts carrier 700 onto which the various ultracapacitor piece parts are loaded. The process for loading piece parts onto the parts carrier 700 can be automated or manual.

The vacuum chamber 100 contains a series of assembly tools that are mounted on a common two-axis motion stage 800. These tools, which may include an adhesive dispenser 820, a heat source 830, and an electrolyte dispenser 840, can be manipulated within the vacuum chamber to perform various packaging operations (e.g., welding, dispensing, etc.).

The chamber also includes a motor 810 with a gripper tip 811 that can be actuated to pick up various ultracapacitor piece parts. The motor 810 is disposed in a fixed location. Parts can be picked up and added to the ultracapacitor package during assembly by coordinating the motor 810 with motion of the stage 800 and parts carrier 700.

Figure 15:
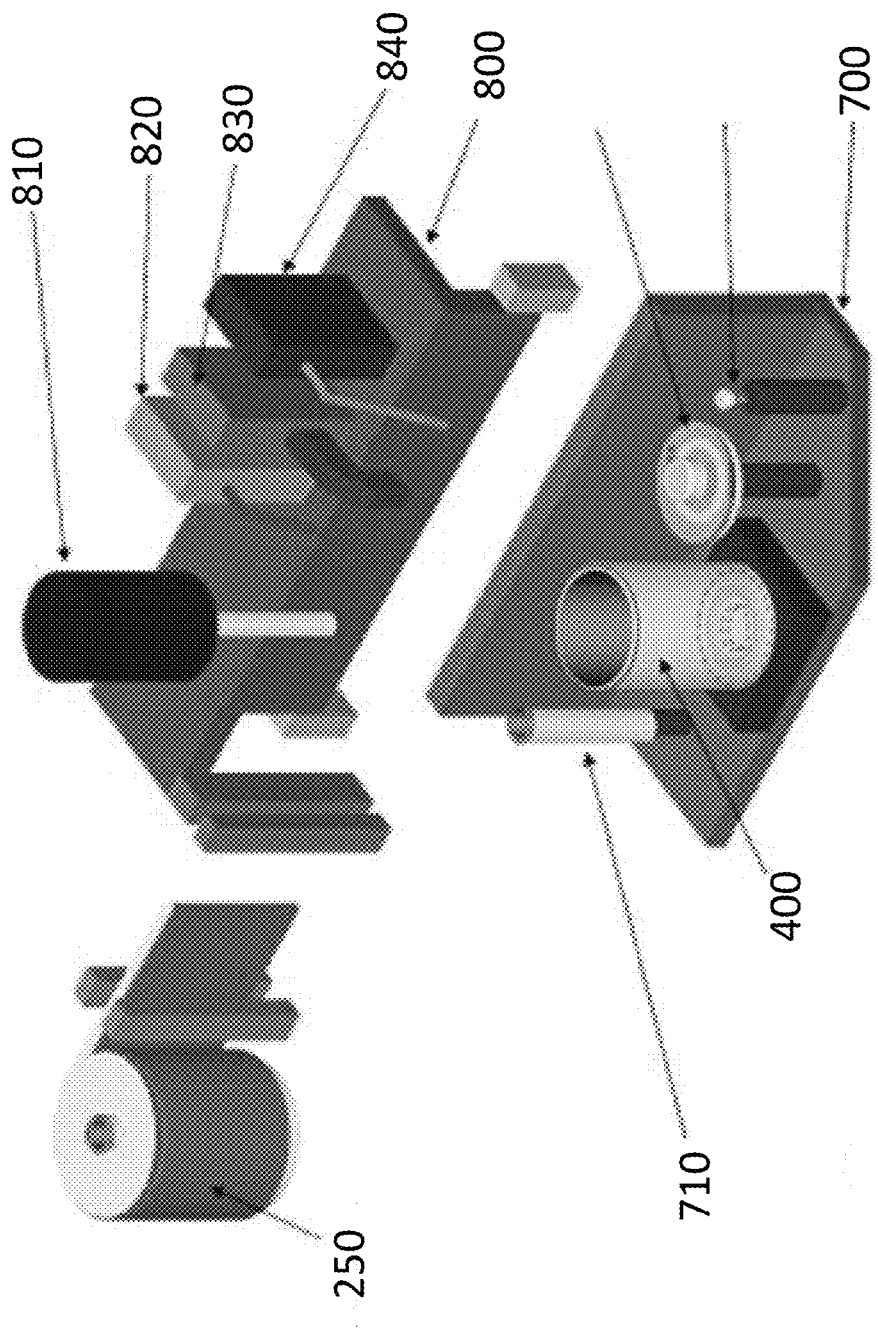
FIG. 15 shows a vacuum chamber configuration after opening load lock doors.

In a first assembly step the load lock 110 containing the carbon-based electrode 250 and separator rolls (not shown) is pumped down. When the load lock 110 is at vacuum the load lock door 111 opens and may remain open throughout the packaging process (FIG. 15). The load lock door can remain open until one of the source electrode or separator rolls needs replacement.

The load lock 114 containing the parts carrier 700 can be pumped down. When it reaches vacuum, the load lock door 115 separating the parts carrier load lock 114 and the vacuum chamber 100 is also open.

Figure 16:
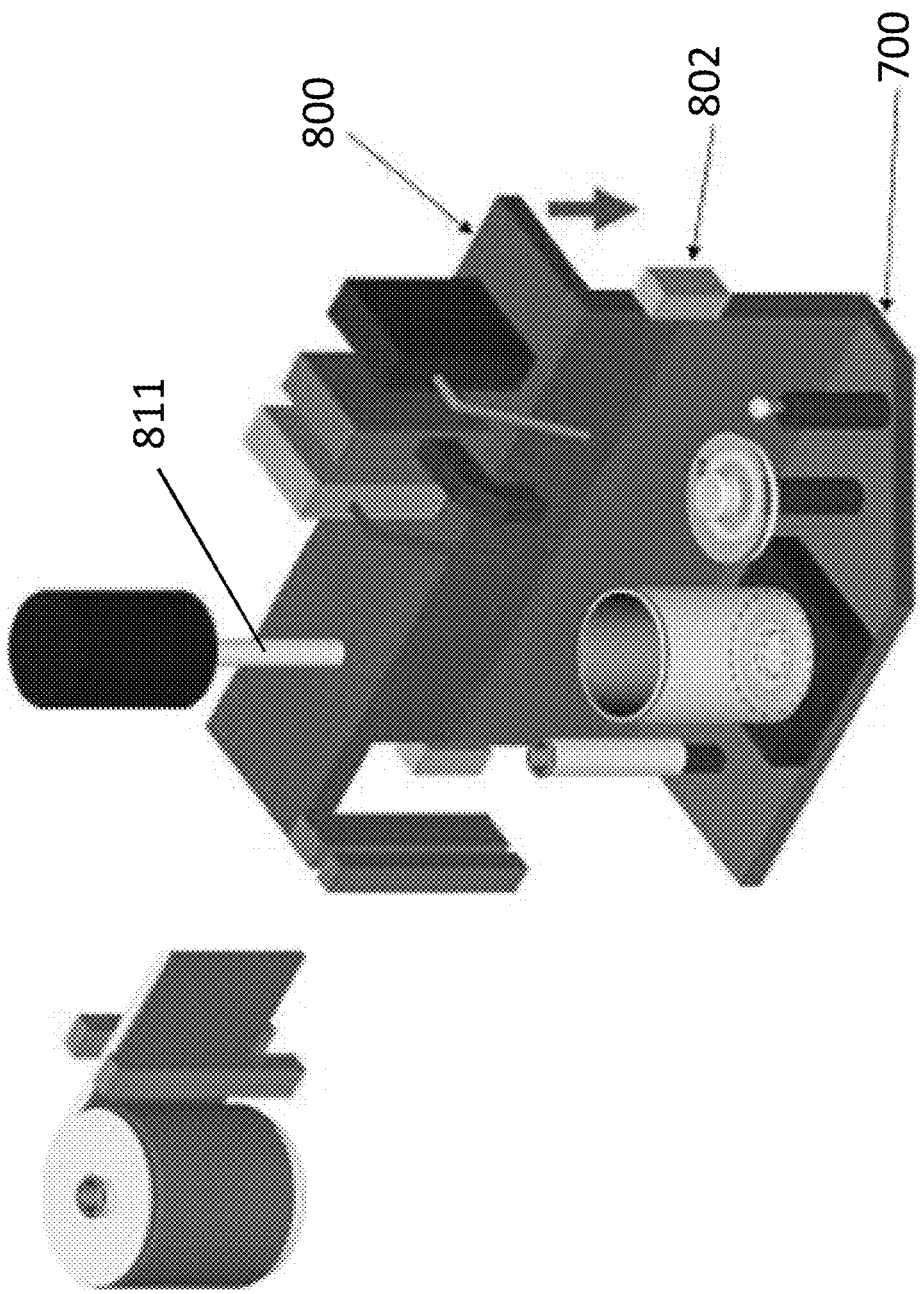
FIG. 16 illustrates pick up of the parts carrier by the motion stage.

The motion stage 800 moves downward into the parts carrier load lock 114, so that carrier grippers 802 located on the motion stage engage and grip the parts carrier (FIG. 16).

Figure 17:
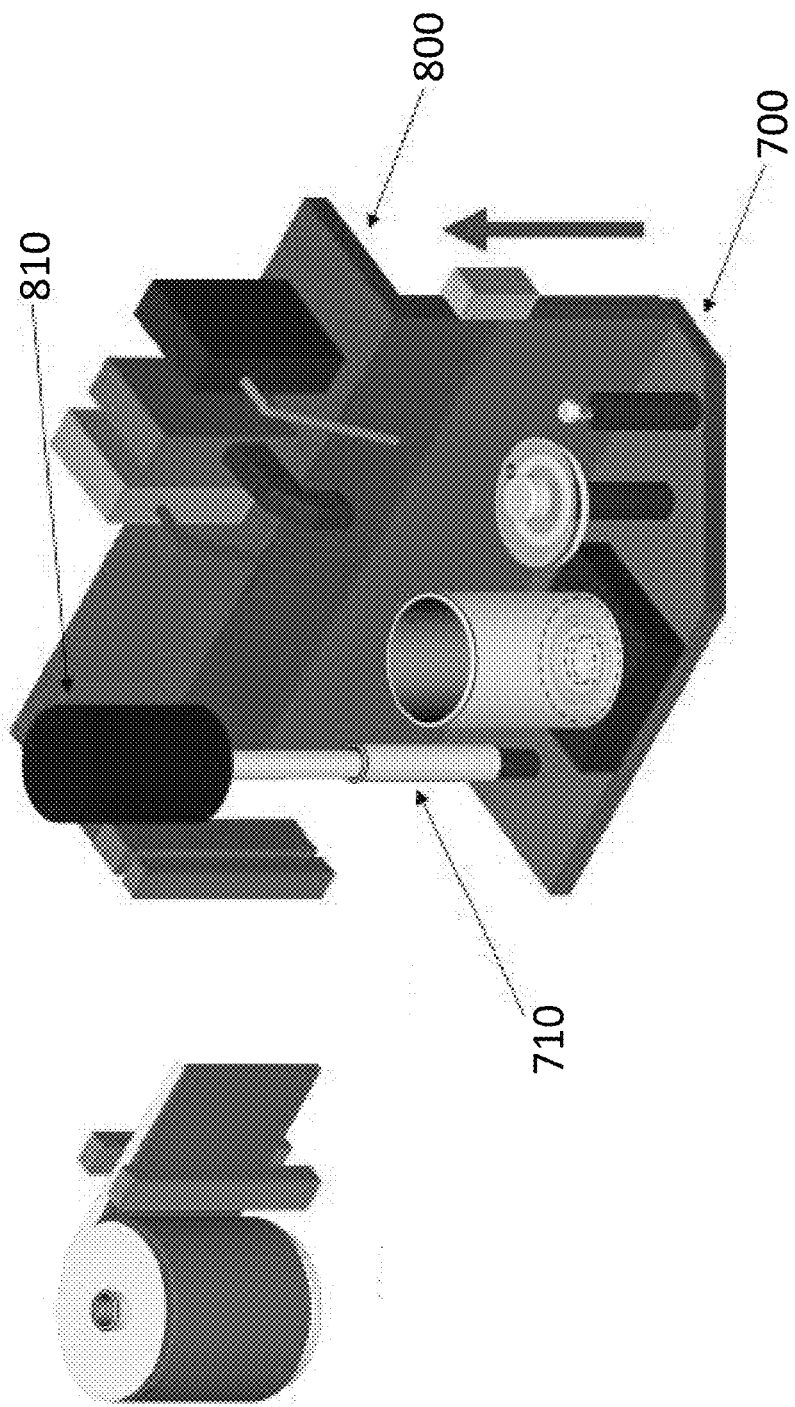
FIG. 17 shows the loading of a spindle onto the motorized winder.

Once the parts carrier 700 is attached to the motion stage 800, the motion stage 800 moves so that the gripper tip at the end of the motor 810 is able to engage a spindle 710 located on the parts carrier (FIG. 17).

Figure 18:
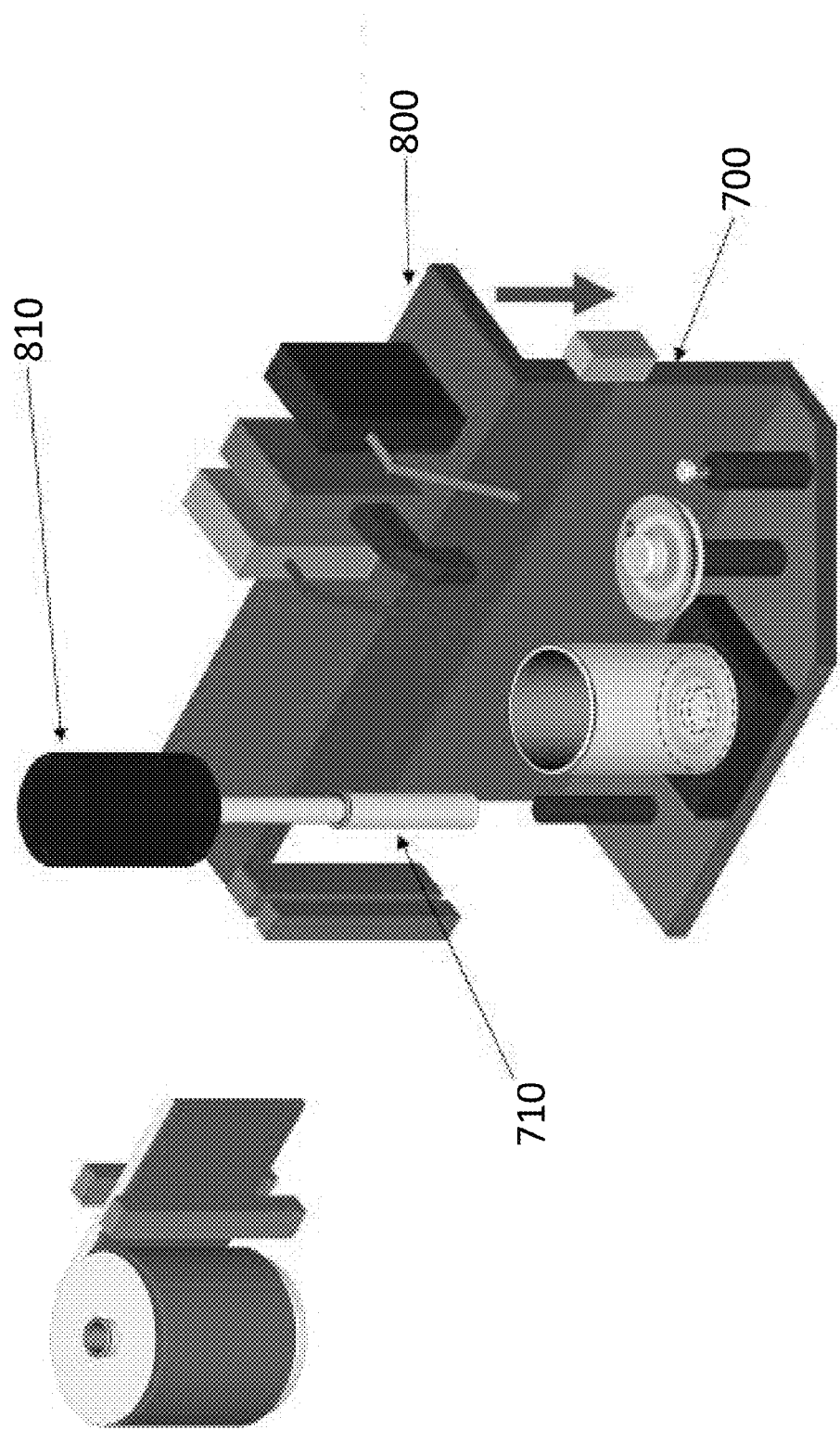
FIG. 18 shows removal of the spindle from the parts carrier.
Figure 19:
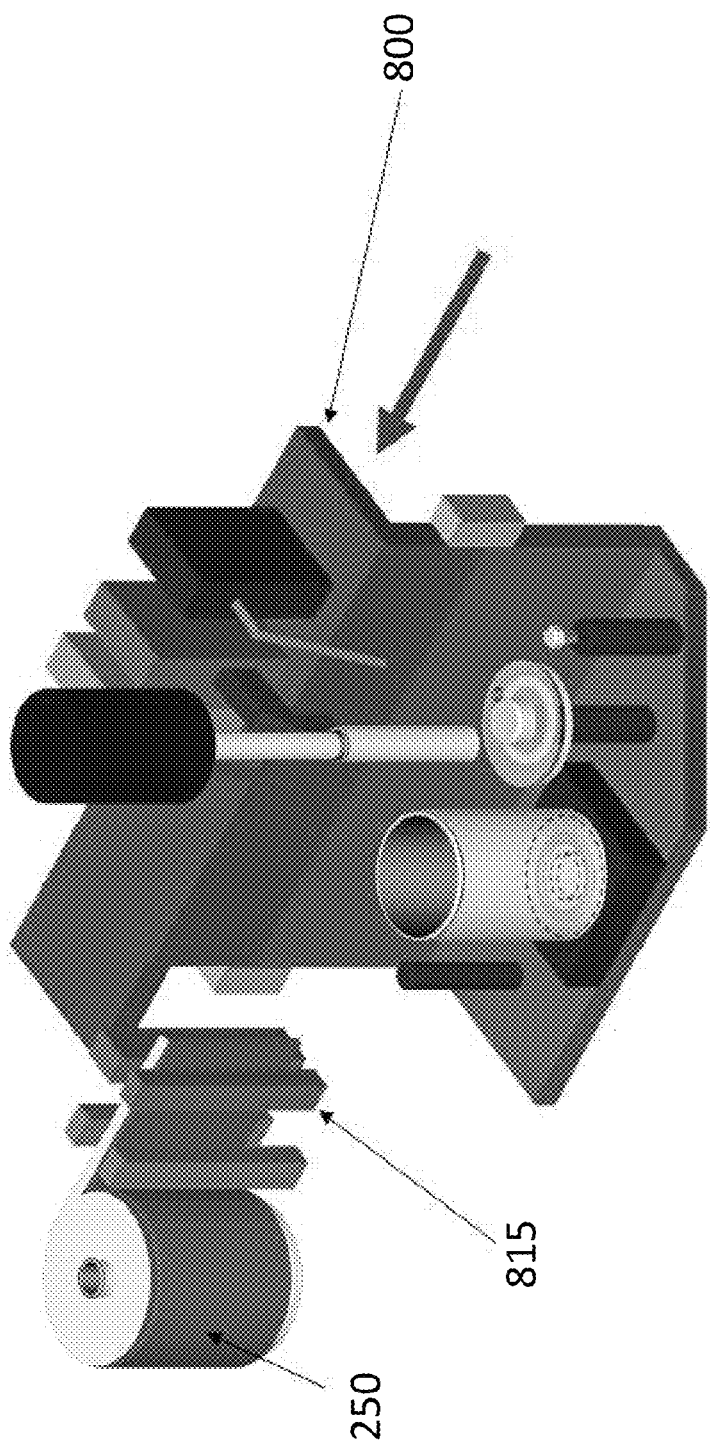
FIG. 19 shows gripping of the electrode with an electrode gripper/cutter tool.

The motion stage 800 moves the part carrier 700 downward to remove the spindle 710 from the parts carrier (FIG. 18).

Figure 20:
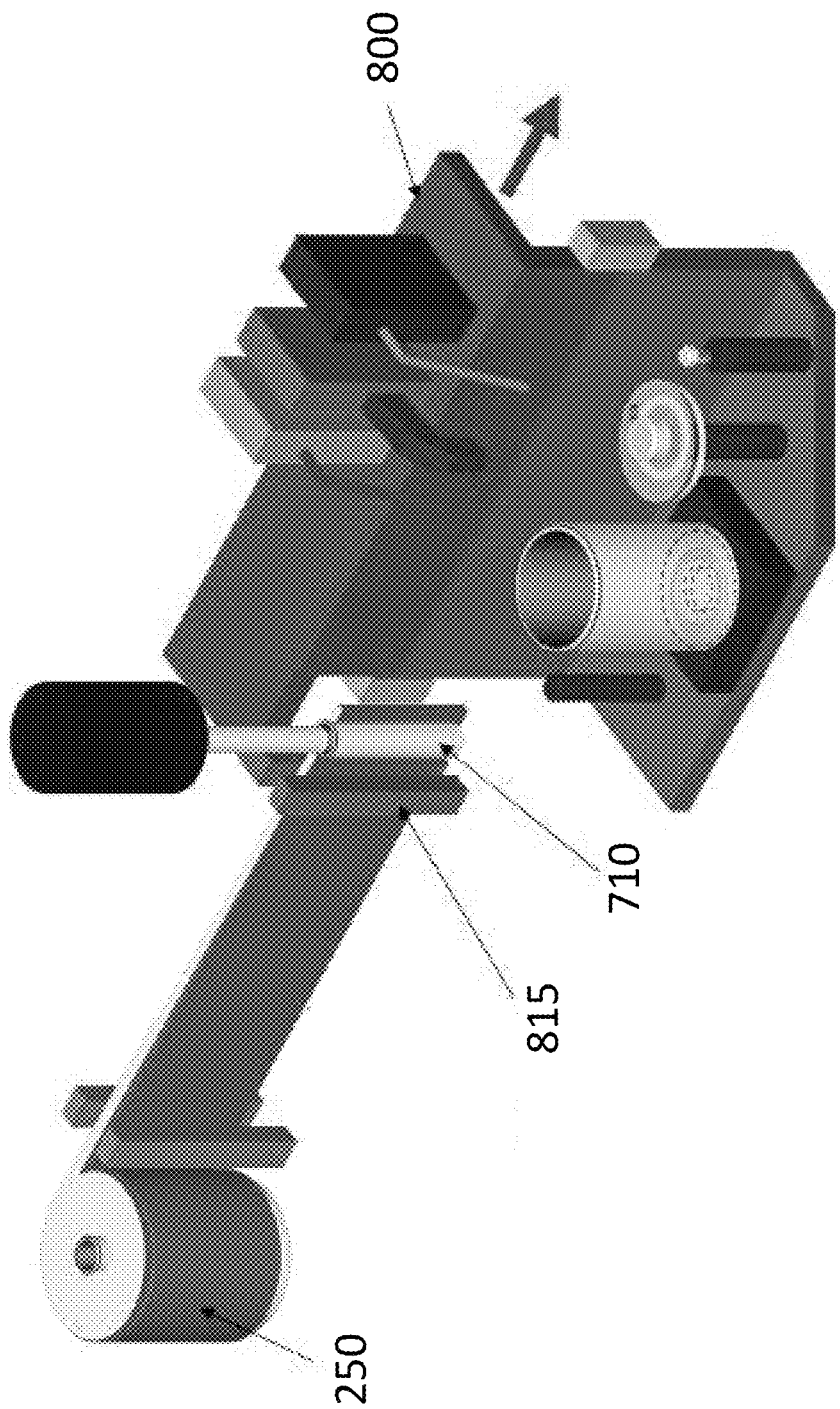
FIG. 20 shows attaching the electrode to the spindle.
Figure 21:
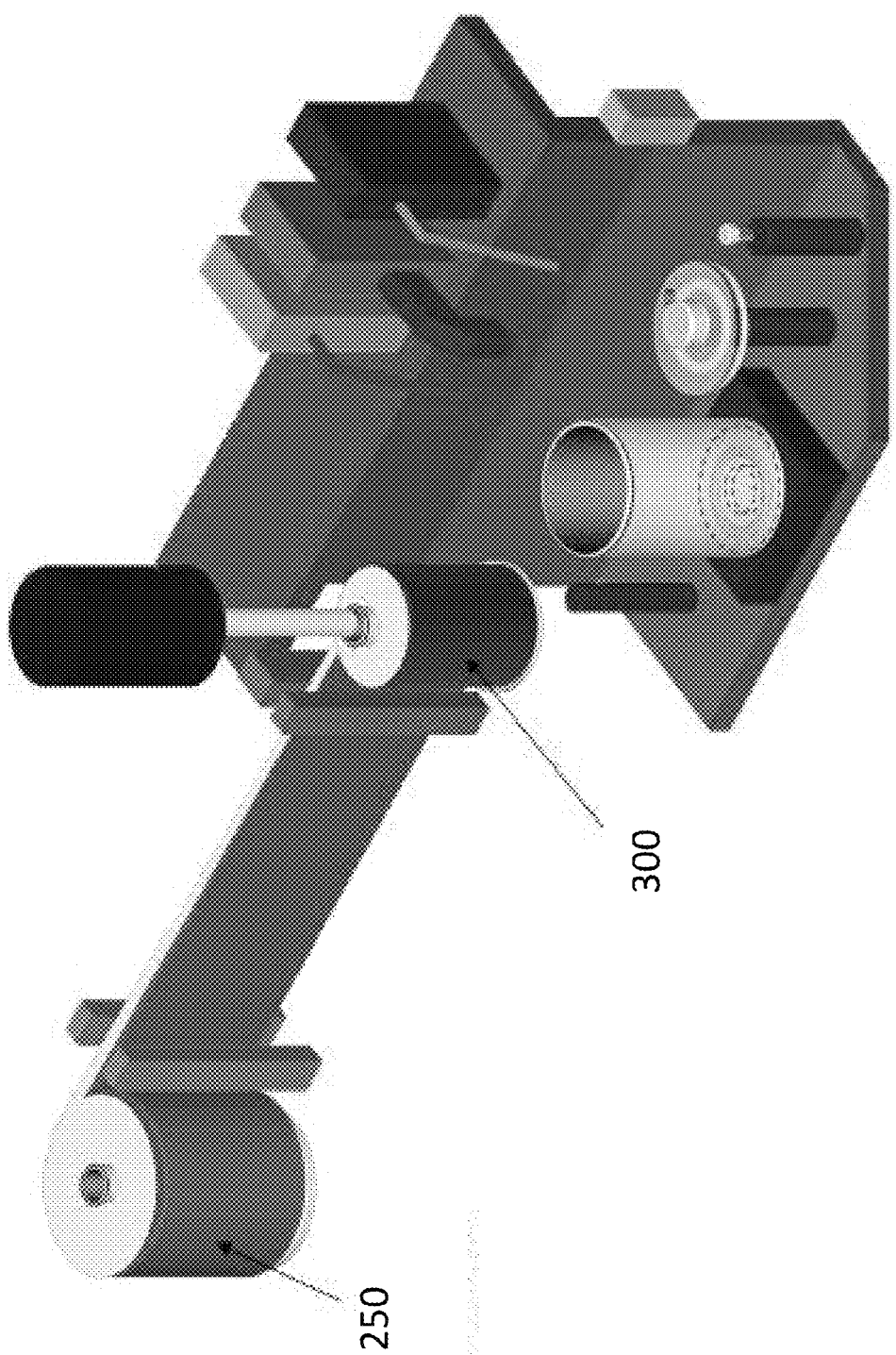
FIG. 21 shows winding the electrode on the spindle.

The motion stage 800 includes an electrode gripper/cutter tool 815 that can be used to grip the electrode sheet (FIG. 19) and pull it off the source electrode roll (FIG. 20). The end of the electrode sheet is then attached to the spindle 710 by, for example, threading the electrode through a slot in the spindle or attaching it with pressure sensitive adhesive.

The electrode material can be dried within the vacuum chamber prior to winding. Heaters may be provided on one or both sides of the electrode sheet to rapidly remove water from the electrode during the drying/winding operation.

The motor 810 turns to wind the electrode sheet onto the spindle. While FIG. 21 only shows the winding of a single sheet, in practice two carbon-based electrodes electrode sheets, two current collector sheets and two separator sheets are aligned and wrapped together around the spindle. The wound sheets form an electrode jellyroll 300.

Figure 22:
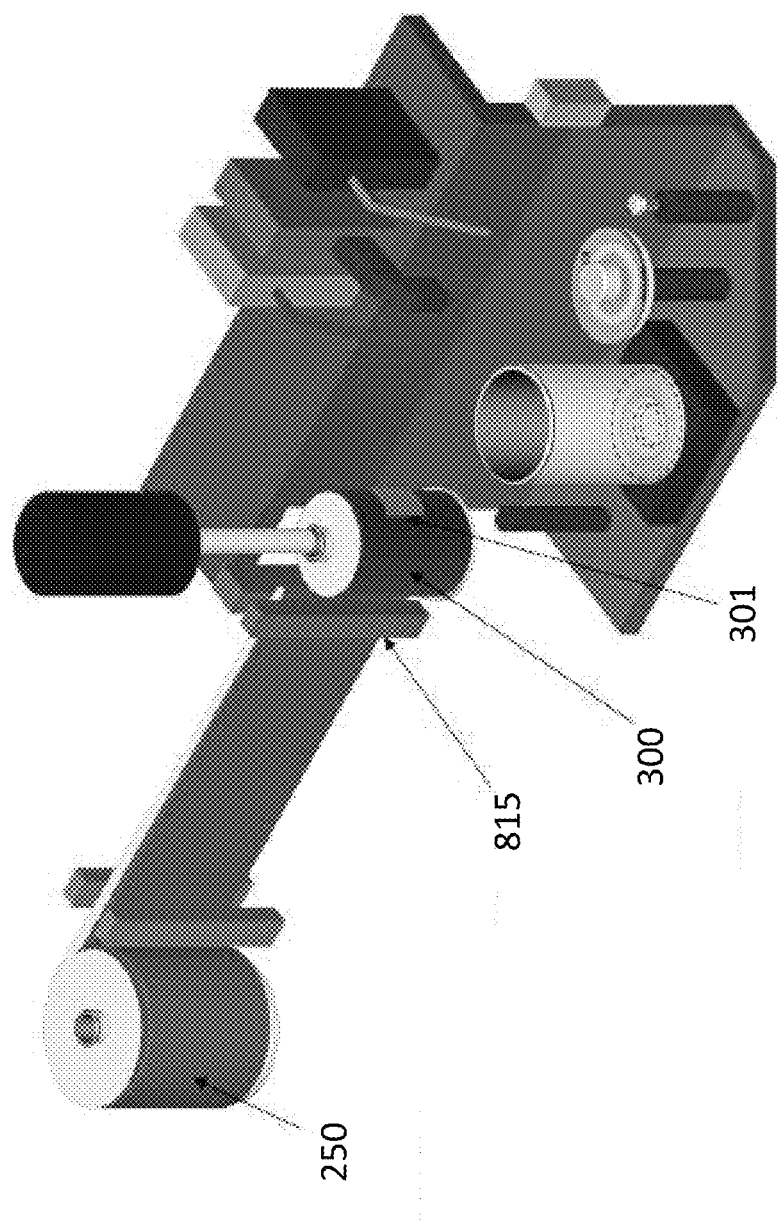
FIG. 22 shows cutting of the electrode and binding the loose end to the roll.

After the electrode is wound into an electrode jelly roll, the electrode gripper/cutter tool 815 cuts the electrode sheet (FIG. 22). Similar gripper/cutting tools (not shown) cut the separator sheets.

The ends of the electrode and separator sheets are held in contact with the exterior surface of the electrode jelly roll using, for example, a small piece of tape 301. This tape is applied using a separate tool that would be mounted on the motion stage (not shown in FIG. 22).

Figure 23:
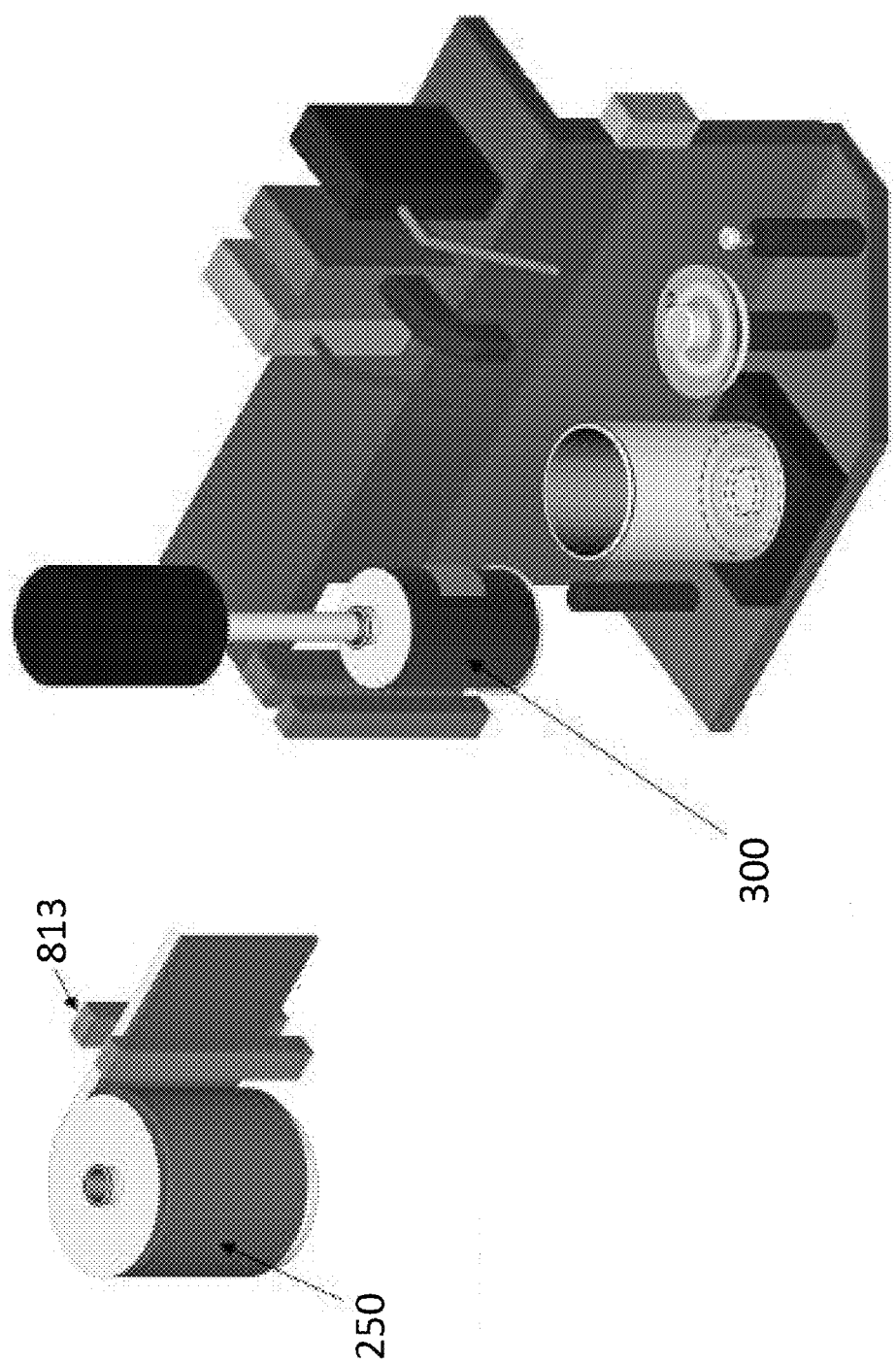
FIG. 23 shows retraction of excess electrode to the source roll.

The unused portion of the electrode sheet is retracted onto the electrode source role (FIG. 23). The end of the electrode sheet is retained in a predefined location using an electrode gripper 813 located within the electrode roll load lock.

Figure 24:
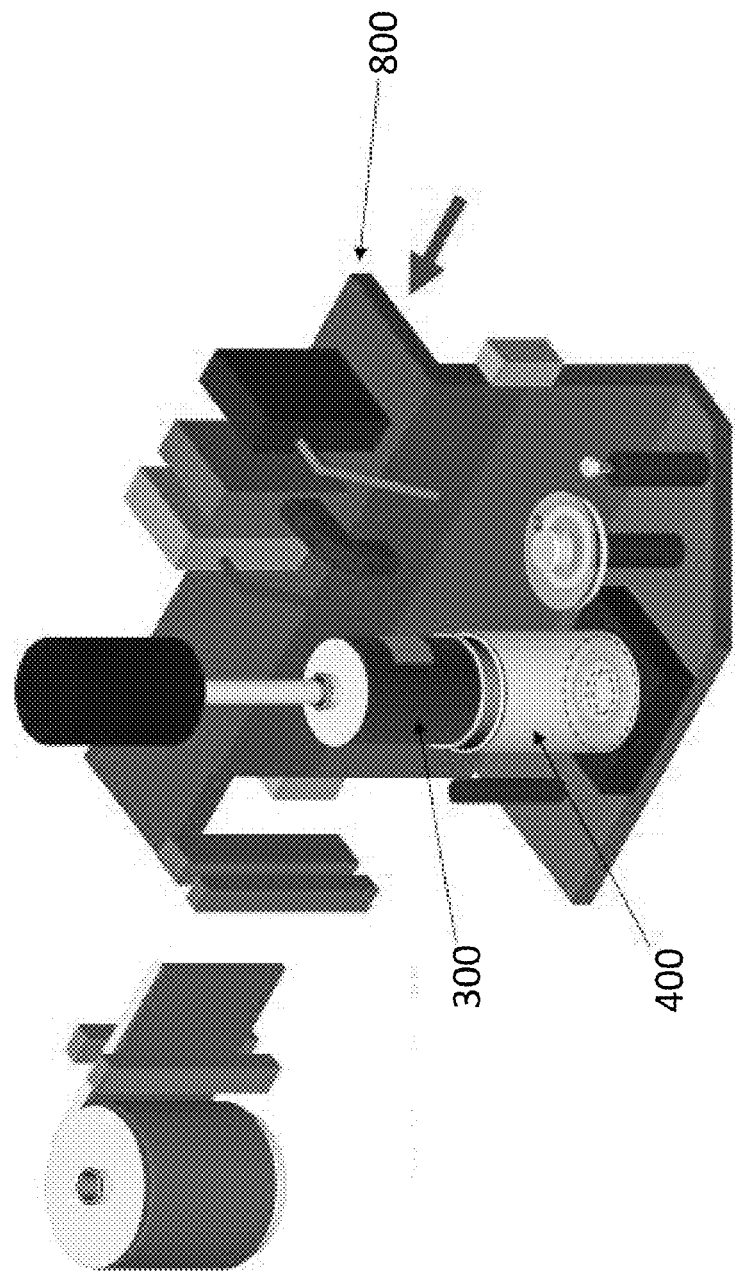
FIG. 24 shows alignment of the jelly roll with respect to the package.
Figure 25:
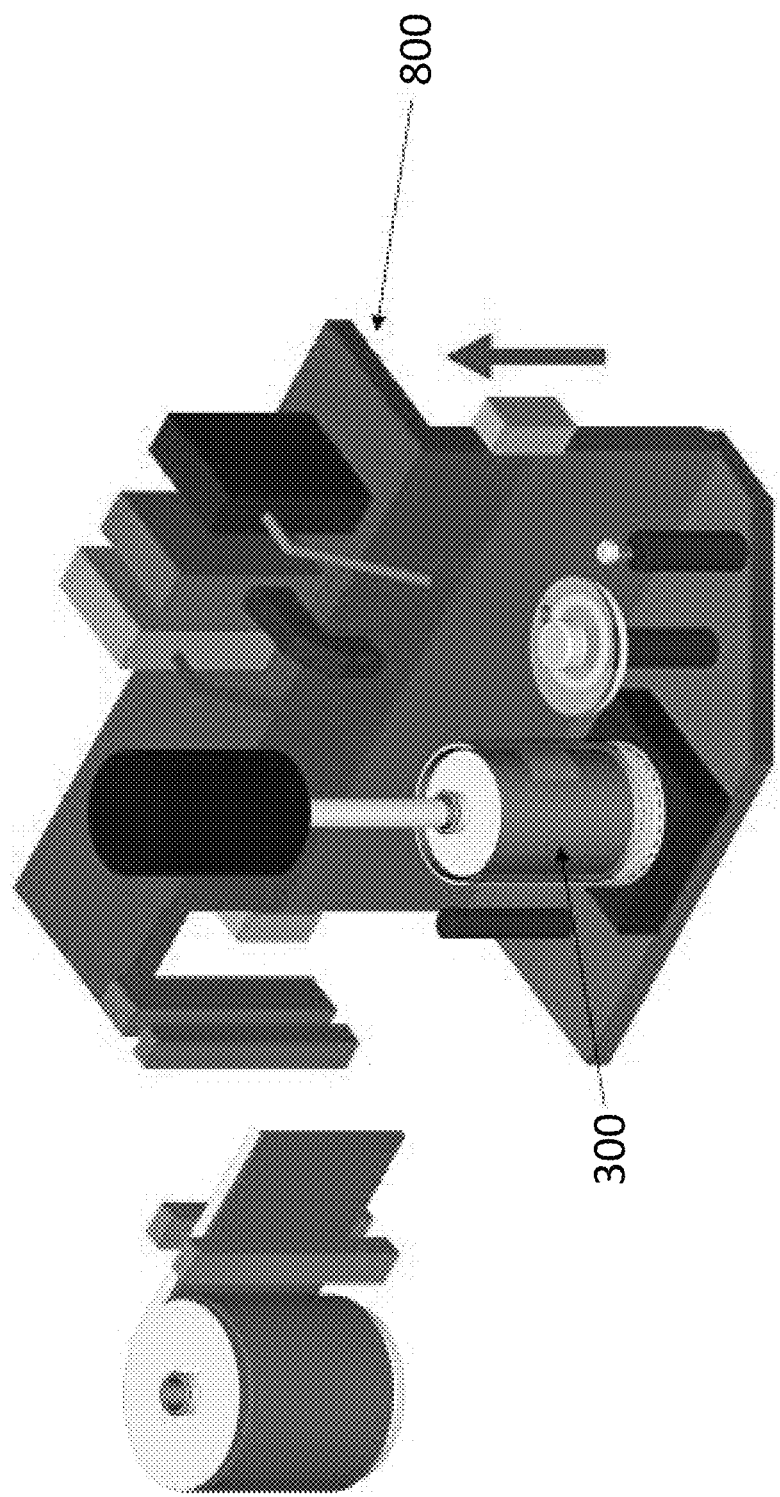
FIG. 25 shows insertion of the jelly roll into the package.

After the electrode jelly roll 300 is wound, the motion stage 800 is moved so that the electrode jelly roll 300 is aligned with the package can 400 on the parts carrier (FIG. 24). Then the motion stage 800 is raised so that the electrode jelly roll 300 is inserted into the can (FIG. 25).

Figure 26:
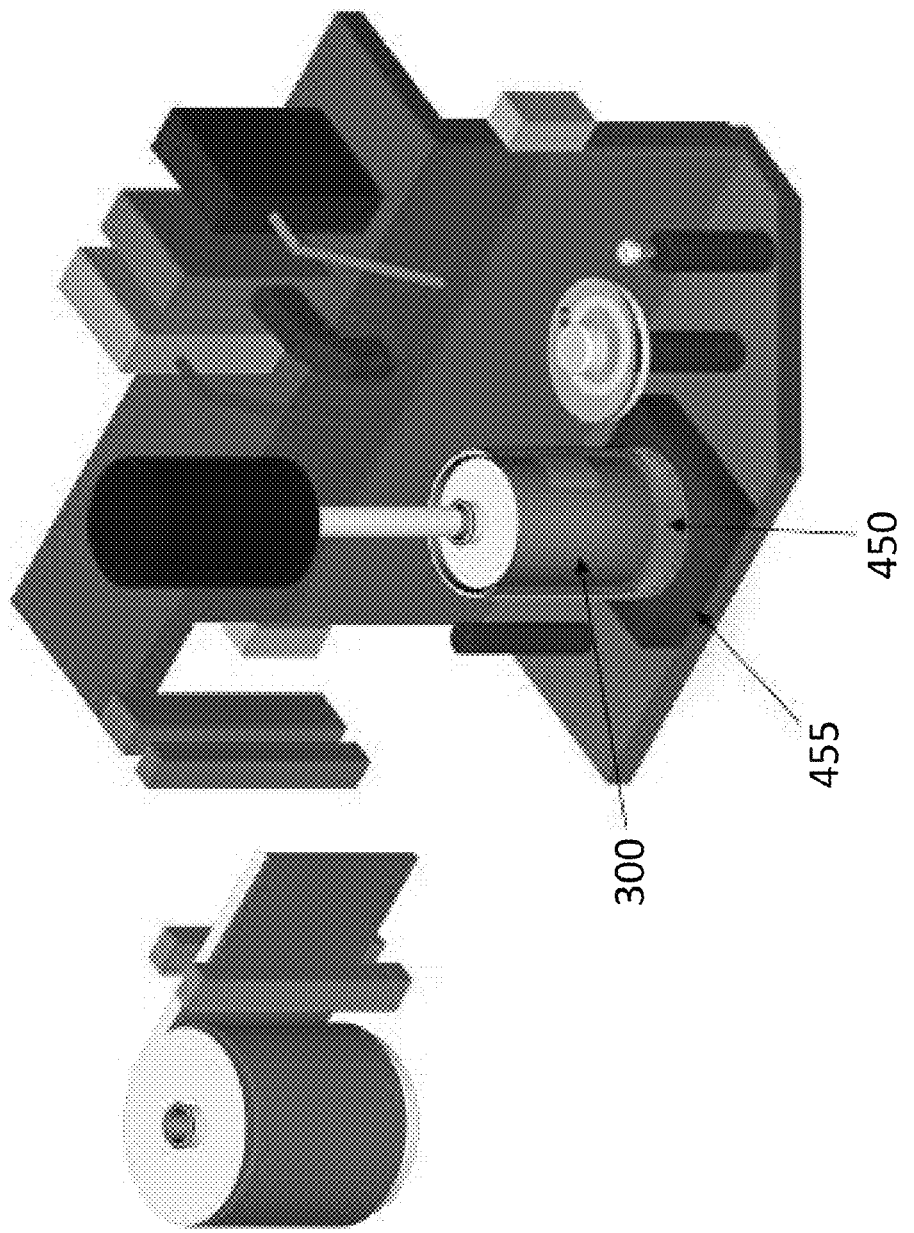
FIG. 26 shows heating of the weld ring to join the jelly roll electrode to the package.

In embodiments, the package can, which can be preloaded with a weld ring 450 of Al—Si alloy material, can be locally heated to join the electrode jelly roll 300 to the can 400. A weld ring heater 455 located below the can be used to heat and melt the weld material (FIG. 26).

Figure 27:
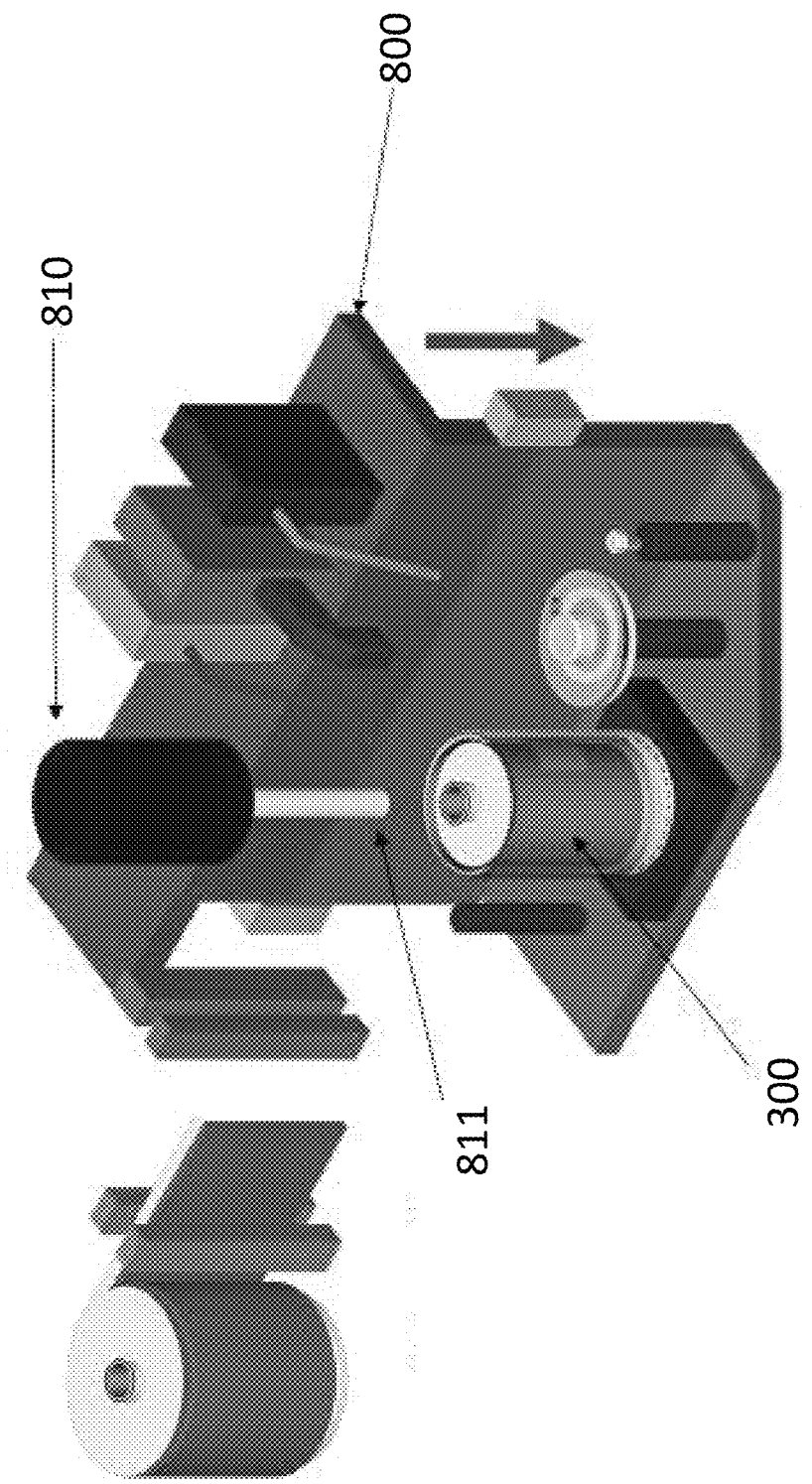
FIG. 27 shows releasing of the electrode jelly roll from the motor gripper tip.
Figure 28:
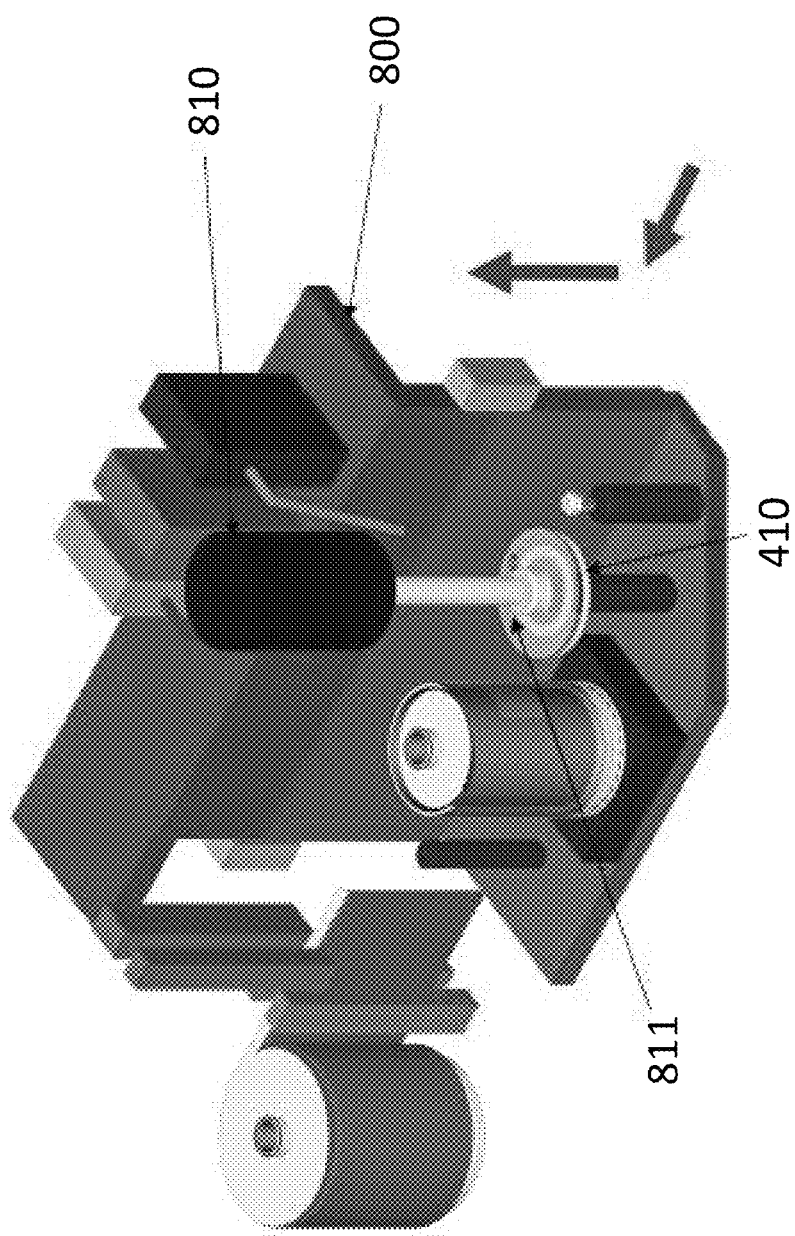
FIG. 28 shows picking up the end cap.

The electrode jelly roll 300 is released from the gripper tip 811, so that the joined electrode jelly roll and package can remains on the parts carrier (FIG. 27). The motion stage 800 then moves so that the gripper tip 811 engages the end cap 410 that rests on the parts carrier (FIG. 28).

Figure 29:
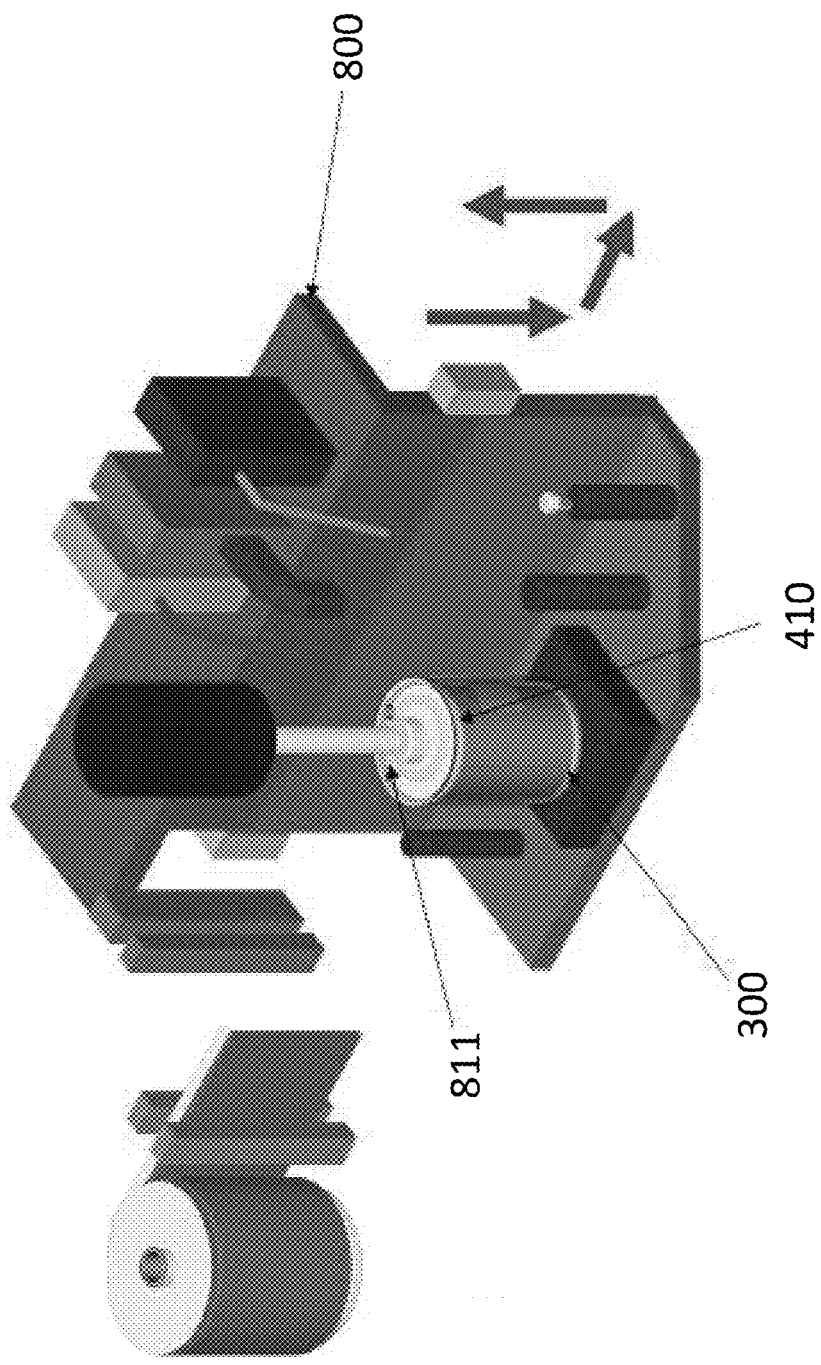
FIG. 29 shows placing the end cap on the package.

After the end cap 410 is retained by the gripper tip 811, the motion stage 800 moves so that the end cap 410 engages with the package can 400 (FIG. 29). After the end cap is forced down onto the package can, the entire package can be picked up using the gripper tip.

Figure 30:
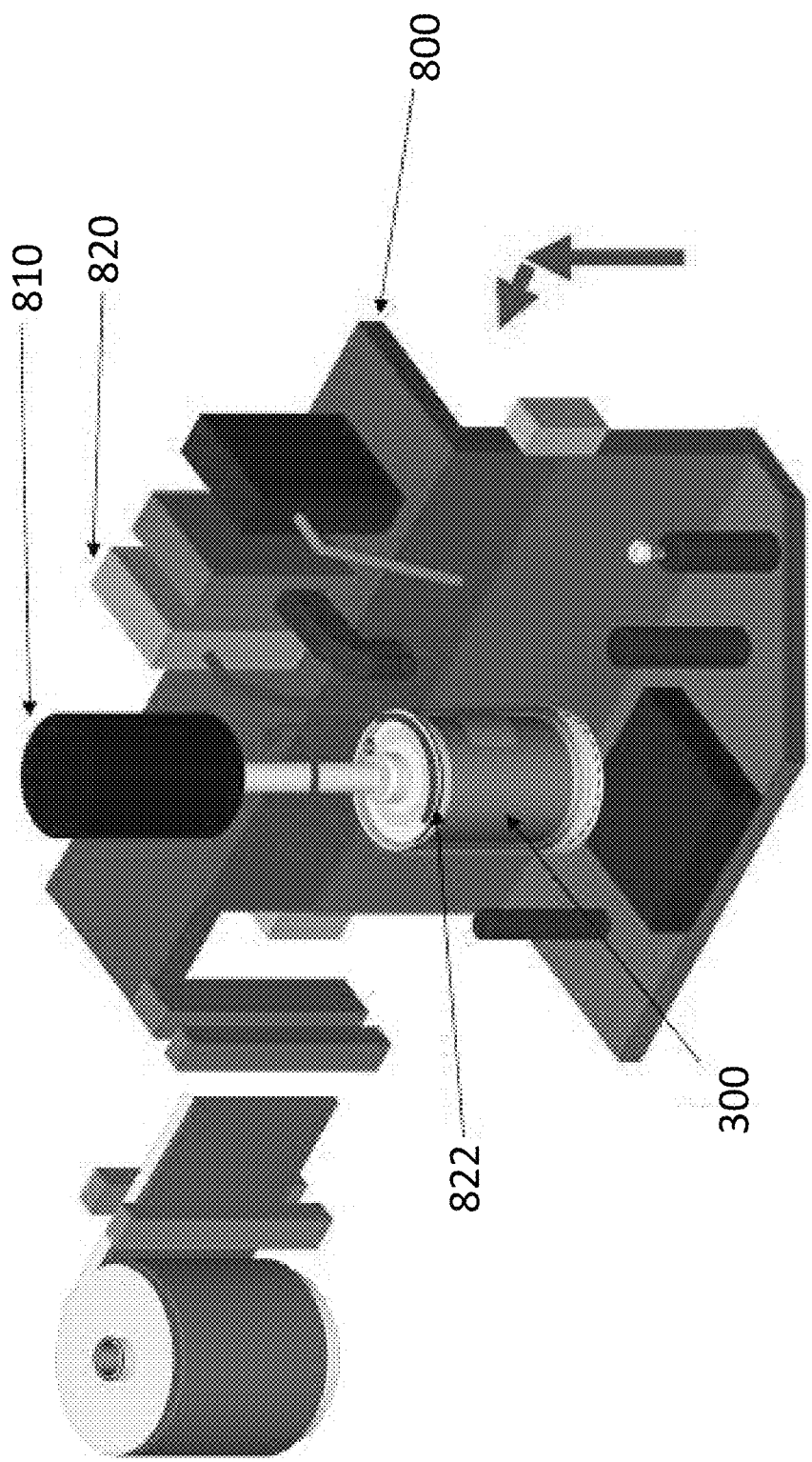
FIG. 30 shows picking up the package to apply an end-cap sealing adhesive.

The motion stage moves the parts carrier downward so that the end cap and can are both retained by the gripper tip. The motion stage 800 then moves so that the tip of an adhesive dispenser 820 is aligned with the rim surface of the package can (FIG. 30). The motor 810 then rotates so that a bead of adhesive 822 is distributed around the perimeter of the end cap.

Figure 31:
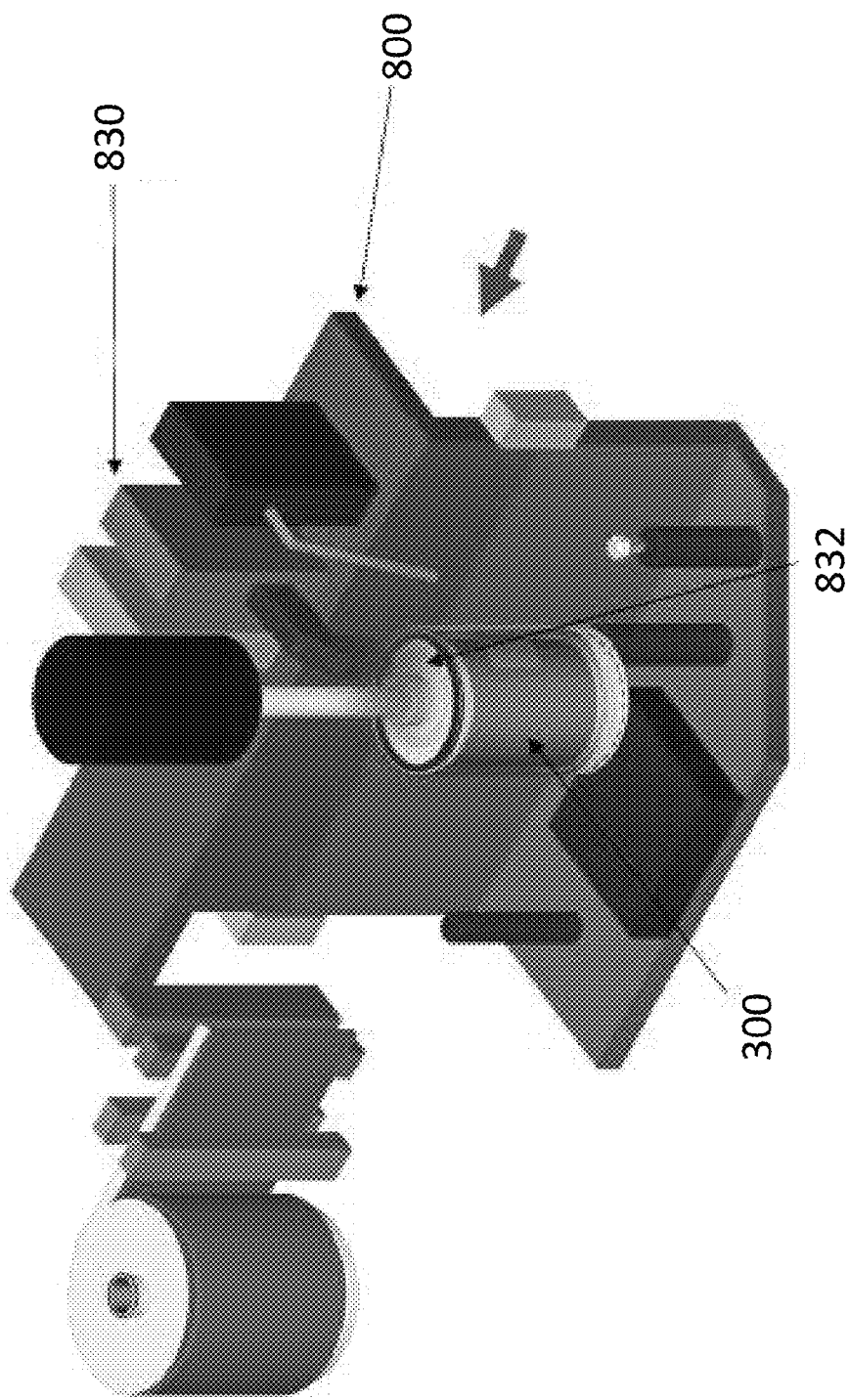
FIG. 31 shows heating of the end cap to melt the weld ring and cure the sealant.

In embodiments, the motion stage 800 moves so that a weld ring heating source 830 is positioned over the weld ring 832 beneath the end cap (FIG. 31). The motor rotates so that heat is applied uniformly around the ring. The heat source can be profiled to provide appropriate heating for both the weld ring and the adhesive ring. At the end of this process the ultracapacitor package is completely sealed, so that its only opening is at the end cap fill port.

Figure 32:
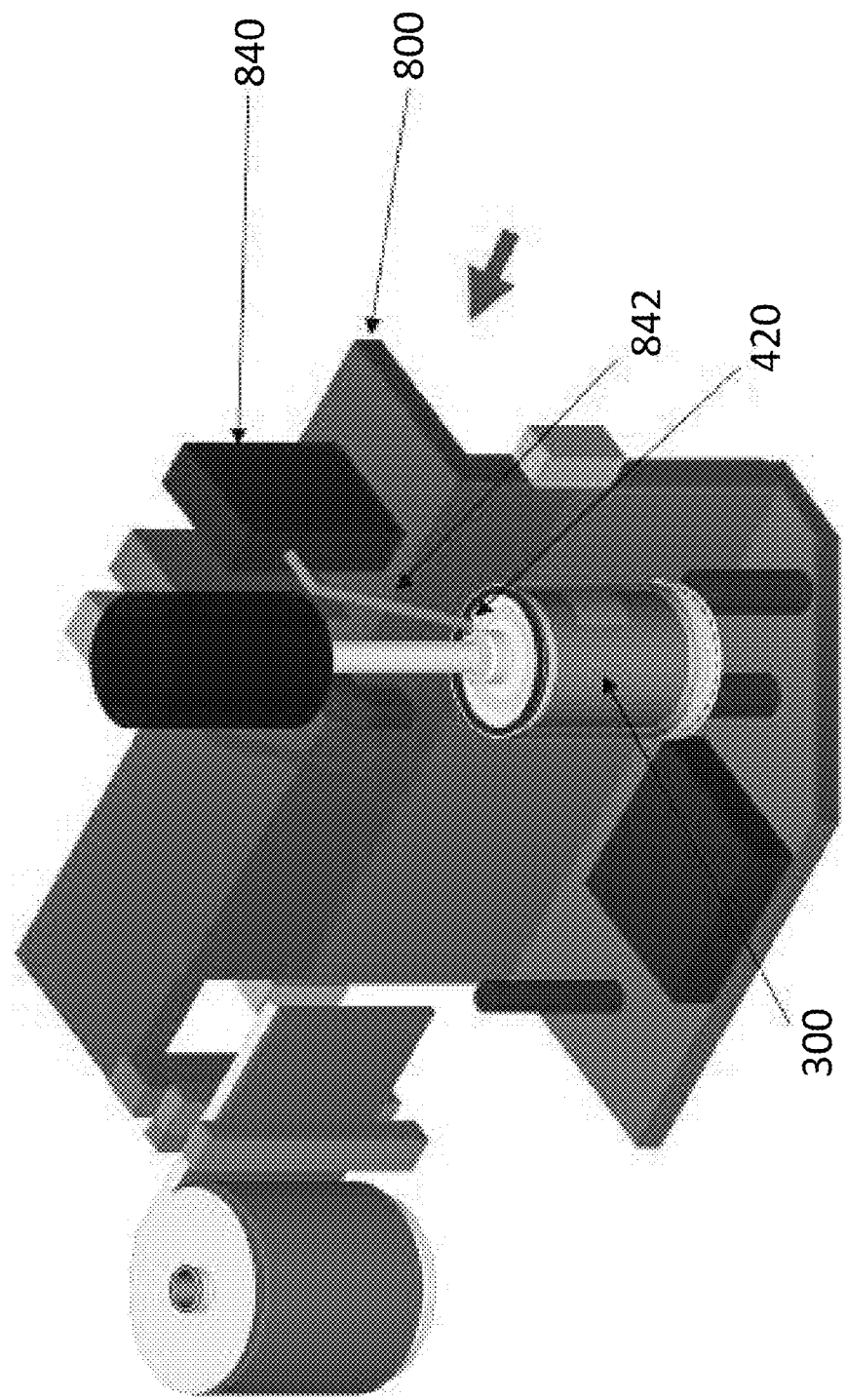
FIG. 32 shows filling of the package with liquid electrolyte.

The motion stage 800 moves so that the tip of the electrolyte dispenser fill tube 842 is aligned to the end cap fill port 420. Example electrolyte dispensing means are illustrated in FIG. 32. The location of the end cap fill port can be determined using a vision system, or by keeping track of all end cap rotations from the time the part is picked up from the parts carrier.

Figure 33:
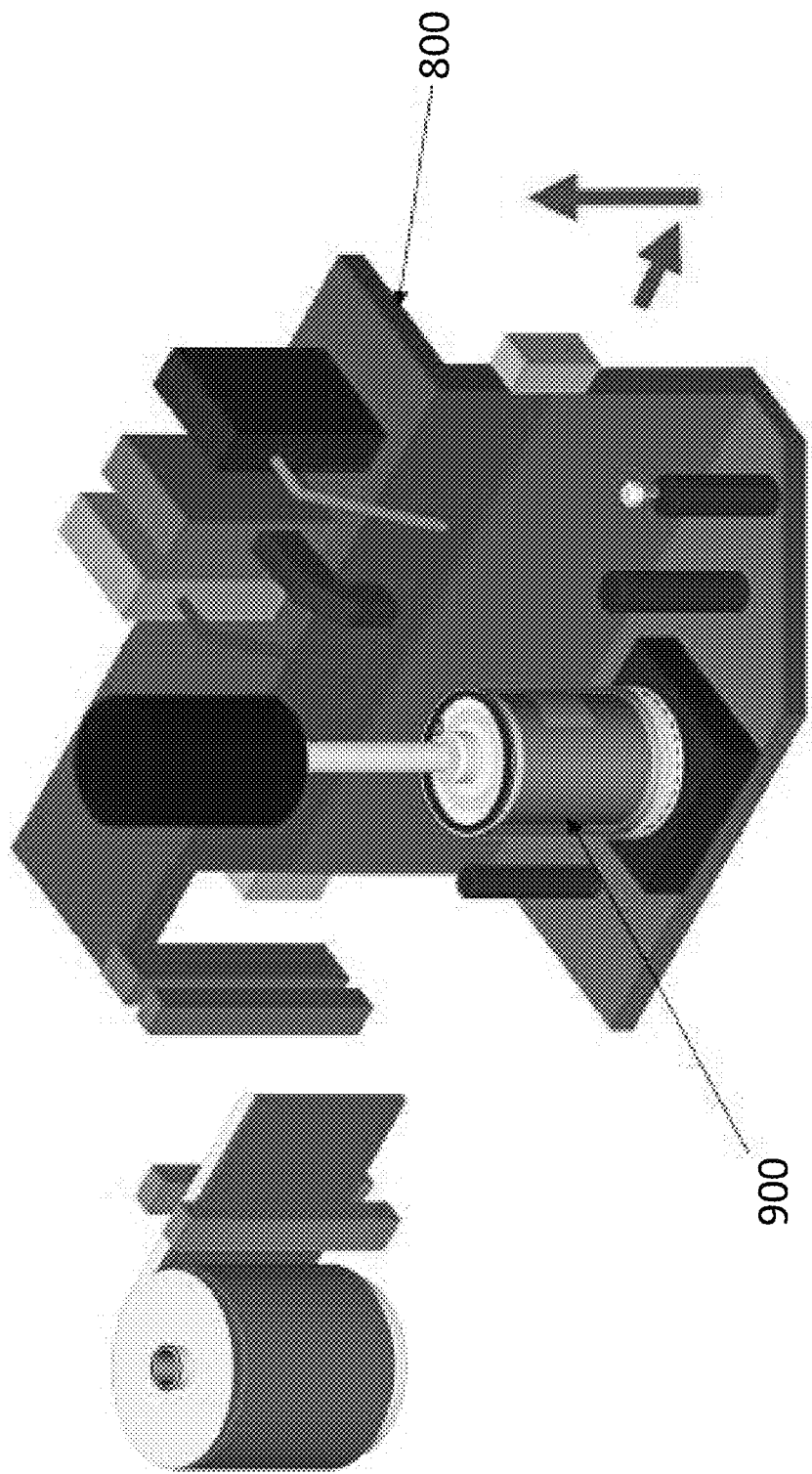
FIG. 33 shows placement of the package on the parts carrier.
Figure 34:
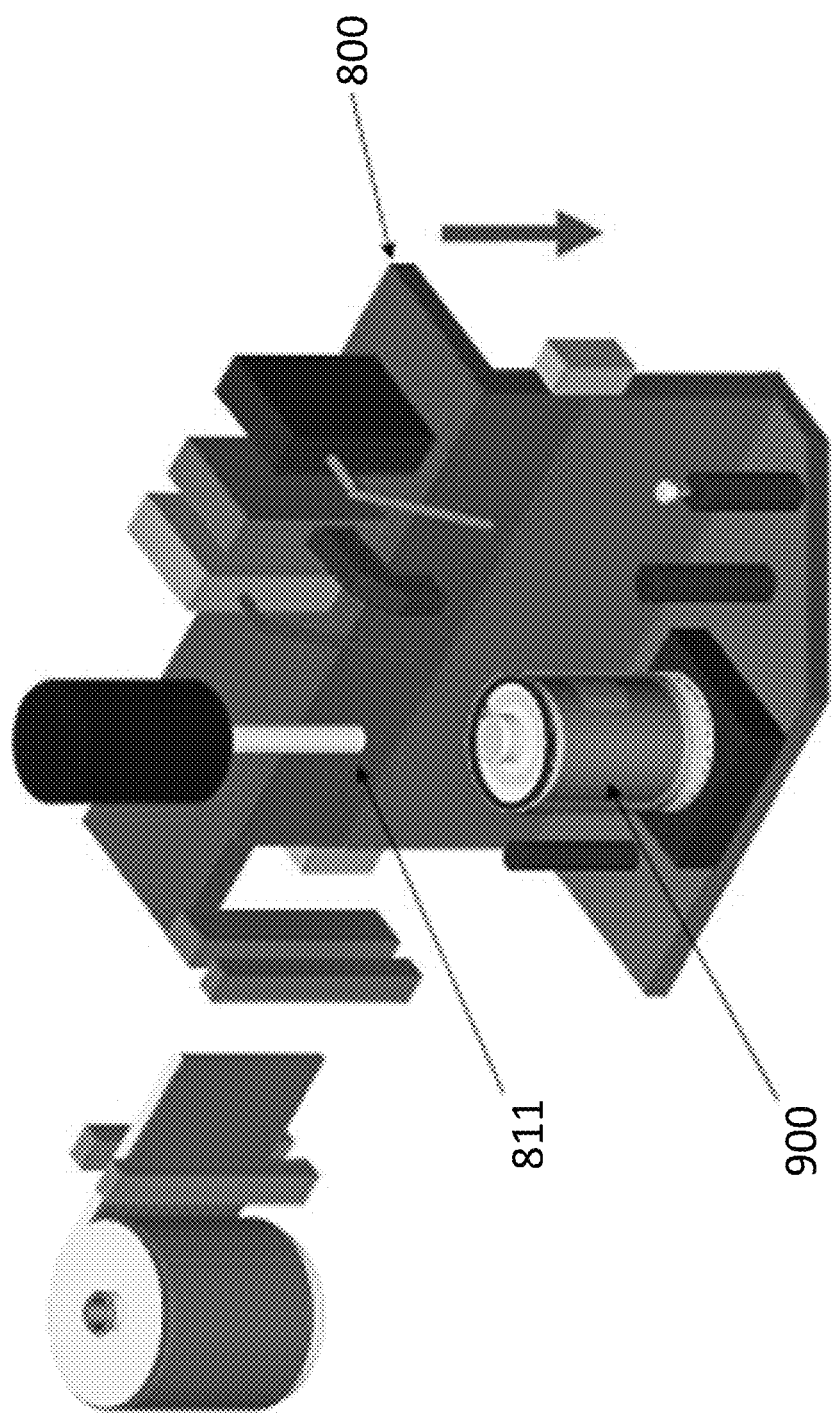
FIG. 34 shows releasing the package from the gripper tip.

The motion stage 800 moves so that the filled ultracapacitor package 900 is aligned with a storage location on the parts carrier (FIG. 33). The gripper tip then releases the ultracapacitor package and the motion stage moves the parts carrier downward away from the gripper tip (FIG. 34).

Figure 35:
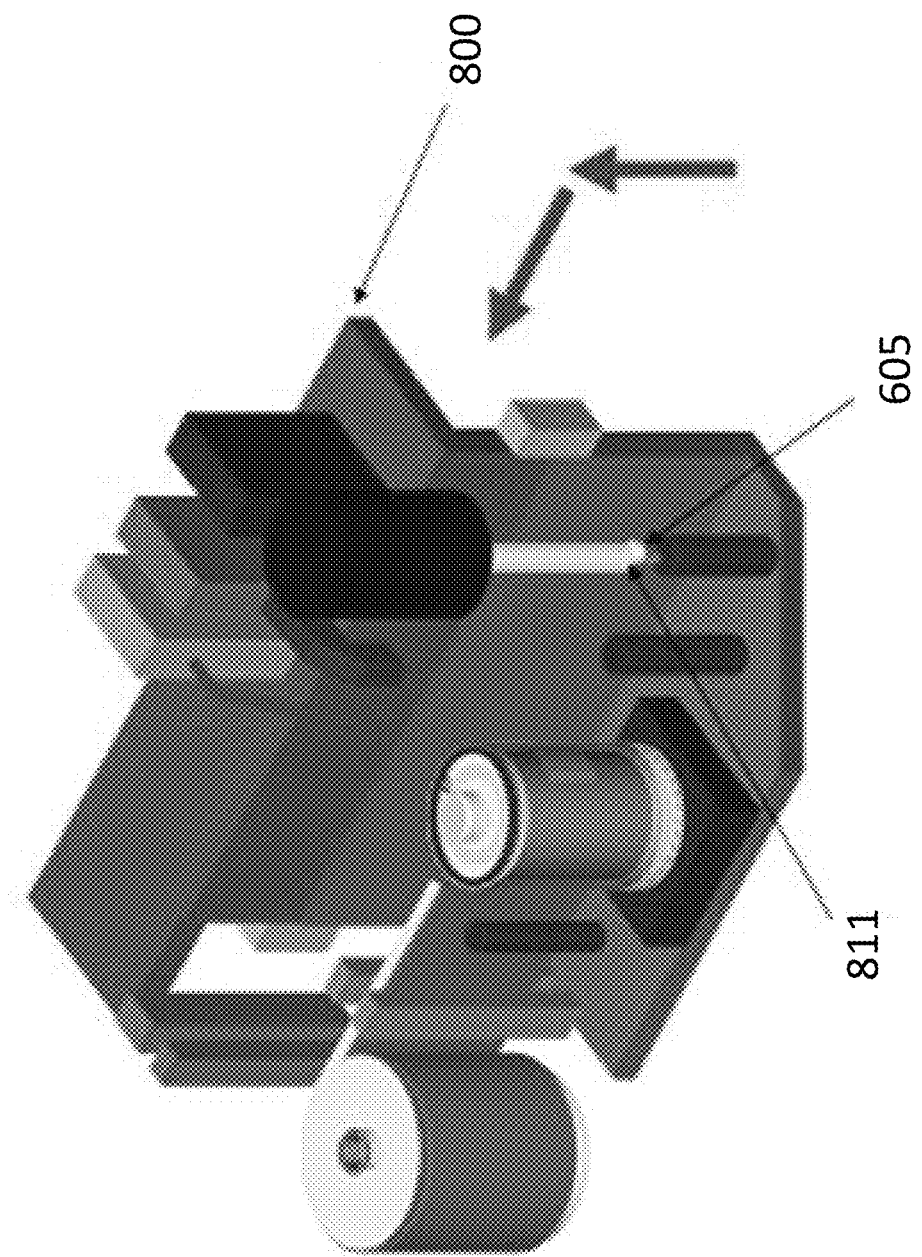
FIG. 35 shows picking up the fill port sealing screw.
Figure 36:
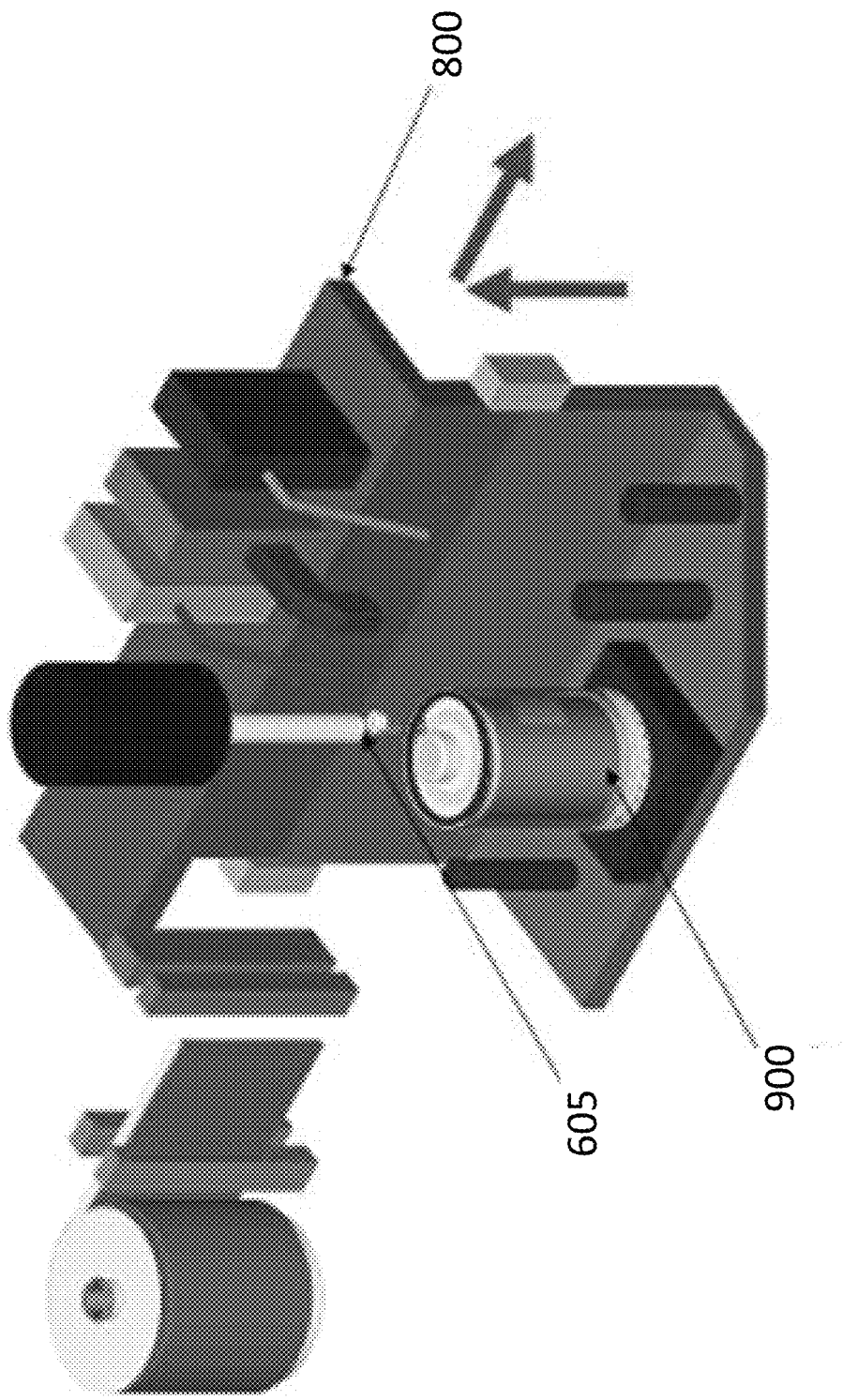
FIG. 36 shows alignment of the sealing screw with the fill port hole.

The motion stage 800 then moves so that the gripper tip 811 engages a sealing screw 605 that is stored on the parts carrier (FIG. 35). The motion stage moves so that the sealing screw 605 is aligned to the end cap fill port (FIG. 36).

Figure 37:
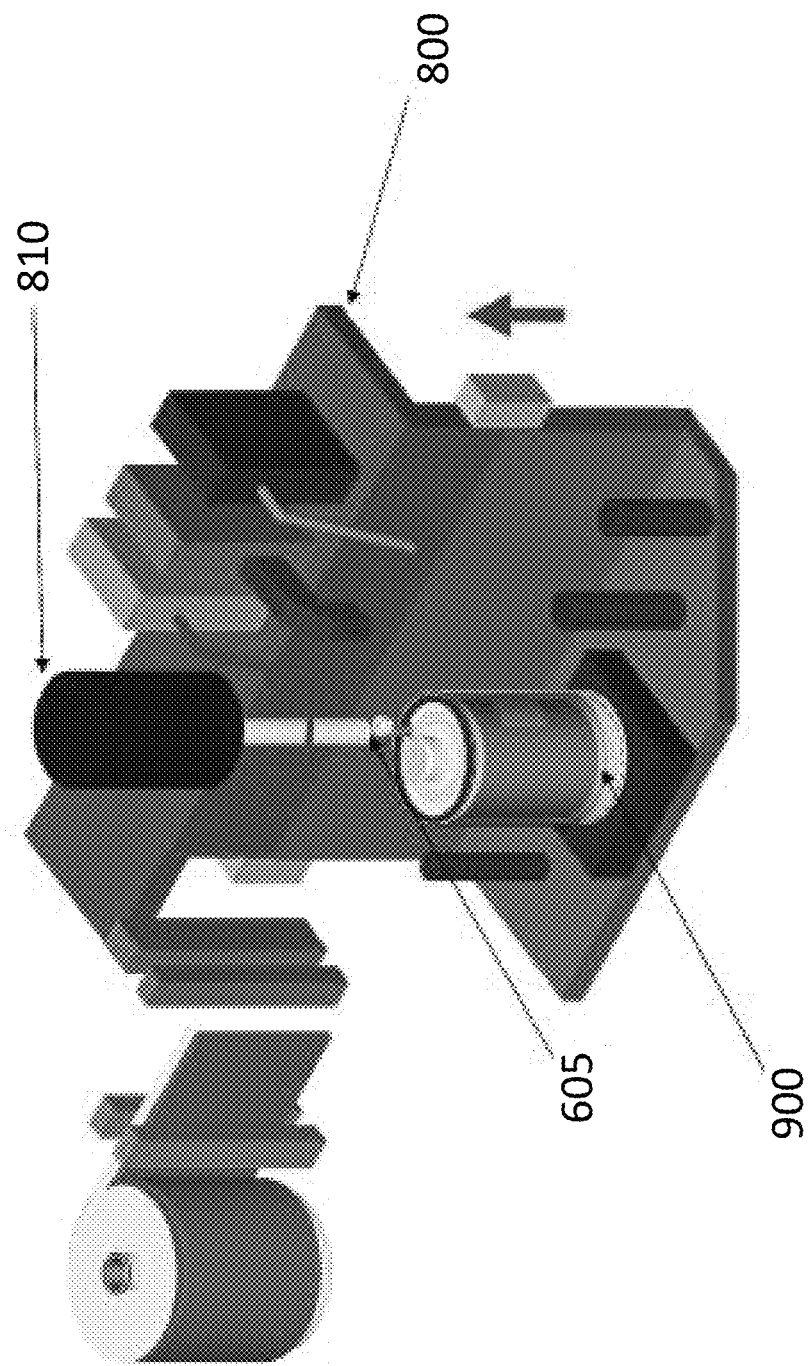
FIG. 37 shows insertion of the sealing screw into the fill port hole.

The motor 810 is then rotated as the motion stage 800 moves upward, allowing the sealing screw 605 to be screwed into the end cap fill port 420 (FIG. 37).

Figure 38:
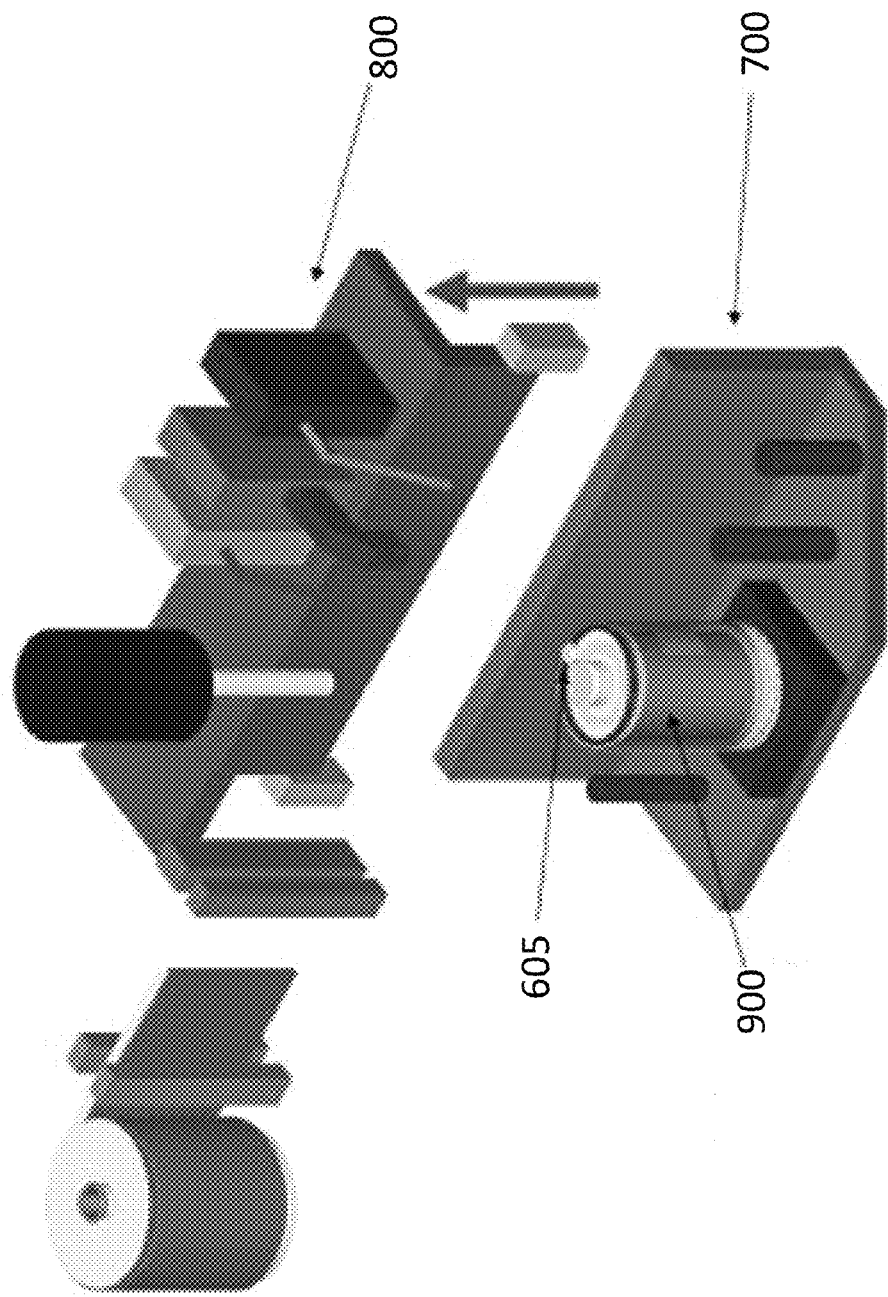
FIG. 38 shows return of the parts carrier with a completed ultracapacitor.

After the ultracapacitor package 900 is sealed, the motion stage 800 releases the parts carrier 700 so that it remains in the parts carrier load lock as the motion stage moves upward (FIG. 38).

Figure 39:
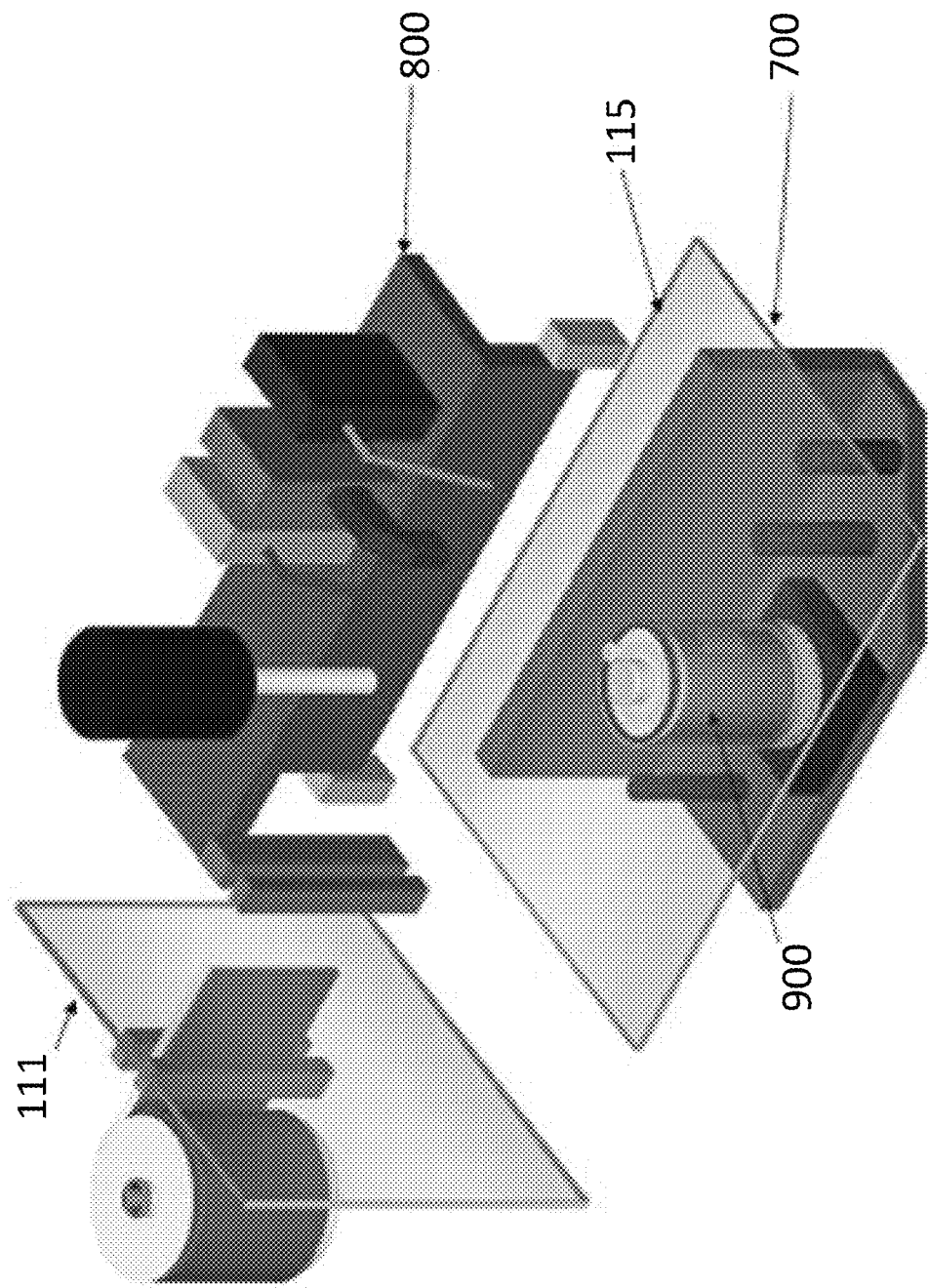
FIG. 39 shows closing the load lock doors and removing the completed ultracapacitor.

The parts carrier load lock door 115 is closed and the parts carrier load lock 114 is vented to atmosphere (FIG. 39). The finished ultracapacitor part is removed from the parts carrier 700, and the next set of ultracapacitor parts may be loaded on the parts carrier. The electrode roll load lock door 111 can be closed if electrode or separator roll replacement is needed, or it may remain open to minimize total load lock pump down and cycle time.

As used herein, the singular forms "a," "an" and "the" include plural referents unless the context clearly dictates otherwise. Thus, for example, reference to a "vacuum chamber" includes examples having two or more such "vacuum chambers" unless the context clearly indicates otherwise.

Ranges can be expressed herein as from "about" one particular value, and/or to "about" another particular value. When such a range is expressed, examples include from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred. Any recited single or multiple feature or aspect in any one claim can be combined or permuted with any other recited feature or aspect in any other claim or claims.

It is also noted that recitations herein refer to a component being "configured" or "adapted to" function in a particular way. In this respect, such a component is "configured" or "adapted to" embody a particular property, or function in a particular manner, where such recitations are structural recitations as opposed to recitations of intended use. More specifically, the references herein to the manner in which a component is "configured" or "adapted to" denotes an existing physical condition of the component and, as such, is to be taken as a definite recitation of the structural characteristics of the component.

While various features, elements or steps of particular embodiments may be disclosed using the transitional phrase "comprising," it is to be understood that alternative embodiments, including those that may be described using the transitional phrases "consisting" or "consisting essentially of," are implied. Thus, for example, implied alternative embodiments to a carbon-based electrode comprising activated carbon, carbon black and a binder include embodiments where a carbon-based electrode consists of activated carbon, carbon black and a binder and embodiments where a carbon-based electrode consists essentially of activated carbon, carbon black and a binder.

It will be apparent to those skilled in the art that various modifications and variations can be made to the present invention without departing from the spirit and scope of the invention. Since modifications, combinations, sub-combinations and variations of the disclosed embodiments incorporating the spirit and substance of the invention may occur to persons skilled in the art, the invention should be construed to include everything within the scope of the appended claims and their equivalents.

We claim:

1. A method of making an ultracapacitor, comprising:
   forming a carbon-based electrode comprising a layer of activated carbon disposed over a current collector, and drying the carbon-based electrode,
   wherein the drying is performed in an atmosphere comprising less than 200 ppm water, and
   wherein the carbon-based electrode is passed through a seal into a vacuum chamber prior to the drying.

2. The method according to claim 1, wherein the drying is performed in an atmosphere comprising less than 100 ppm water.

3. The method according to claim 1, further comprising winding or stacking pairs of the carbon-based electrodes interleaved with separator sheets to fabricate a jelly roll or prismatic electrode assembly.

4. The method according to claim 3, further comprising inserting the electrode assembly into a package and forming electrical connections between the electrode assembly and package terminals.

5. The method according to claim 4, further comprising filling the package with a liquid electrolyte and sealing the package, wherein the filling is performed while the package is under vacuum.

6. The method according to claim 3, wherein drying the carbon-based electrode is performed prior to winding the carbon-based electrode.

7. A method of making an ultracapacitor, comprising:
   coating a porous activated carbon material onto current collector sheets to form carbon-based electrodes,
   drying the carbon-based electrodes,
   winding or stacking carbon-based electrodes interleaved with separator sheets to fabricate a jelly roll or prismatic electrode assembly,
   inserting the electrode assembly into a package and forming electrical connections between the electrode assembly and package terminals,
   filling the package with a liquid electrolyte, and sealing the package,
   wherein at least the acts of drying, winding, inserting, and filling are performed under vacuum, and
   wherein the vacuum is maintained between the acts of drying and filling.

8. The method according to claim 7, wherein the activated carbon material is coated onto both sides of the current collector sheets.

9. The method according to claim 7, wherein the vacuum pressure is from $10^{-5}$ to $10^{-1}$ torr.

10. The method according to claim 7, further comprising passing the carbon-based electrode through a seal into a vacuum chamber prior to the drying.

* * * * *